(12) United States Patent
Roberts et al.

(10) Patent No.: US 11,477,302 B2
(45) Date of Patent: Oct. 18, 2022

(54) COMPUTER-IMPLEMENTED SYSTEM AND METHOD FOR DISTRIBUTED ACTIVITY DETECTION

(71) Applicant: Palo Alto Research Center Incorporated, Palo Alto, CA (US)

(72) Inventors: Michael Roberts, Los Gatos, CA (US); Shane Ahern, Foster City, CA (US); Evgeniy Bart, Santa Clara, CA (US); David Gunning, Seattle, WA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 172 days.

(21) Appl. No.: 15/203,764

(22) Filed: Jul. 6, 2016

(65) Prior Publication Data

US 2018/0013843 A1 Jan. 11, 2018

(51) Int. Cl.
*G06F 16/335* (2019.01)
*G06F 16/9535* (2019.01)
(Continued)

(52) U.S. Cl.
CPC .......... *H04L 67/535* (2022.05); *G06F 16/337* (2019.01); *G06F 16/9535* (2019.01);
(Continued)

(58) Field of Classification Search
CPC . H04L 67/22; H04L 67/535; G06F 17/30702; G06F 16/337; G06F 16/9535; G06N 20/00; G06N 20/10; H04W 4/029
(Continued)

(56) References Cited

U.S. PATENT DOCUMENTS

| | | |
|---|---|---|
| 5,895,470 A | 4/1999 | Pirolli et al. |
| 5,966,534 A | 10/1999 | Cooke et al. |

(Continued)

FOREIGN PATENT DOCUMENTS

| | | |
|---|---|---|
| AU | 2017202840 A1 | 5/2017 |
| CA | 2 378 765 A1 | 9/2002 |

(Continued)

OTHER PUBLICATIONS

Rello et al., "Detecting Readers with Dyslexia Using Machine Learning with Eye Tracking Measures," May 18-20, 2015, W4A '15 Proceedings of the 12th Web for All Conference, pp. 1-8.

(Continued)

*Primary Examiner* — Ashish Thomas
*Assistant Examiner* — Nargis Sultana
(74) *Attorney, Agent, or Firm* — Burns & Levinson, LLP; Steven M. Mills

(57) ABSTRACT

A computer-implemented system and method for distributed activity detection is provided. Contextual data collected for a user performing an activity is processed on a mobile computing device. The mobile computing device extracts features from the contextual data and compares the features with a set of models. Each model represents an activity. A confidence score is assigned to each model based on the comparison with the features and the mobile computing device transmits the features to a server when the confidence scores for the models are low. The server trains a new model using the features and sends the new model to the mobile computing device.

20 Claims, 6 Drawing Sheets

(51) Int. Cl.
*G06N 20/00* (2019.01)
*H04L 67/50* (2022.01)
*H04W 4/029* (2018.01)
*G06N 20/10* (2019.01)

(52) U.S. Cl.
CPC ............ *G06N 20/00* (2019.01); *G06N 20/10* (2019.01); *H04W 4/029* (2018.02)

(58) Field of Classification Search
USPC ....................................................... 707/728
See application file for complete search history.

(56) References Cited

U.S. PATENT DOCUMENTS

| | | | |
|---|---|---|---|
| 6,037,976 A | 3/2000 | Wixson | |
| 6,131,110 A | 10/2000 | Bates et al. | |
| 6,134,532 A | 10/2000 | Lazarus et al. | |
| 6,175,831 B1 | 1/2001 | Weinreich et al. | |
| 6,249,807 B1 | 6/2001 | Shaw et al. | |
| 6,320,495 B1 | 11/2001 | Sporgis | |
| 6,338,066 B1 | 1/2002 | Martin et al. | |
| 6,345,253 B1 | 2/2002 | Viswanathan | |
| 6,393,479 B1 | 5/2002 | Glommen et al. | |
| 6,408,288 B1 | 6/2002 | Ariyoshi | |
| 6,456,234 B1 | 9/2002 | Johnson | |
| 6,523,063 B1 | 2/2003 | Miller et al. | |
| 6,526,351 B2 | 2/2003 | Whitham | |
| 6,546,393 B1 | 4/2003 | Khan | |
| 6,587,835 B1 | 7/2003 | Treyz et al. | |
| 6,680,675 B1 | 1/2004 | Suzuki | |
| 6,691,106 B1 | 2/2004 | Sathyanarayan | |
| 6,714,778 B2 | 3/2004 | Nykänen et al. | |
| 6,756,882 B2 | 6/2004 | Benes et al. | |
| 6,816,884 B1 | 11/2004 | Summers et al. | |
| 6,853,982 B2 | 2/2005 | Smith et al. | |
| 6,968,179 B1 | 11/2005 | De Vries | |
| 6,981,040 B1 | 12/2005 | Konig et al. | |
| 7,043,475 B2 | 5/2006 | Heer et al. | |
| 7,130,622 B2 | 10/2006 | Vanska Marko; et al. | |
| 7,171,046 B2 | 1/2007 | Myers et al. | |
| 7,194,454 B2 | 3/2007 | Hansen et al. | |
| 7,200,637 B2 | 4/2007 | Klos et al. | |
| 7,203,909 B1 | 4/2007 | Horvitz et al. | |
| 7,231,607 B2 | 6/2007 | Neely et al. | |
| 7,243,130 B2 | 7/2007 | Horvitz et al. | |
| 7,260,573 B1 | 8/2007 | Jeh et al. | |
| 7,269,650 B2 | 9/2007 | Hamdan | |
| 7,305,436 B2 | 12/2007 | Willis | |
| 7,315,883 B2 | 1/2008 | Fair et al. | |
| 7,346,668 B2 | 3/2008 | Willis | |
| 7,346,703 B2* | 3/2008 | Cope ................... | G06F 11/3438 709/24 |
| 7,349,827 B1 | 3/2008 | Heller et al. | |
| 7,526,458 B2 | 4/2009 | Flinn et al. | |
| 7,543,031 B2 | 6/2009 | Heidloff et al. | |
| 7,565,425 B2 | 7/2009 | Van Fleet et al. | |
| 7,577,522 B2 | 8/2009 | Rosenberg | |
| 7,603,112 B2 | 10/2009 | Huomo et al. | |
| 7,639,840 B2 | 12/2009 | Hanna et al. | |
| 7,652,594 B2 | 1/2010 | Lamont et al. | |
| 7,707,226 B1 | 4/2010 | Tonse | |
| 7,716,651 B2 | 5/2010 | Cukierman et al. | |
| 7,739,338 B2 | 6/2010 | Taylor | |
| 7,739,602 B2 | 6/2010 | Feng et al. | |
| 7,743,050 B1* | 6/2010 | Bem .................. | G06F 16/24575 707/713 |
| 7,765,470 B2 | 7/2010 | Epstein | |
| 7,831,670 B2 | 11/2010 | Goodman et al. | |
| 7,831,707 B2 | 11/2010 | Bardsley | |
| 7,831,928 B1 | 11/2010 | Rose et al. | |
| 7,835,578 B2 | 11/2010 | Cheng et al. | |
| 7,885,844 B1* | 2/2011 | Cohen .................. | G06Q 10/10 |
| 7,886,011 B2 | 2/2011 | Buchheit | |
| 7,945,653 B2 | 5/2011 | Zuckerberg et al. | |
| 7,949,574 B2 | 5/2011 | Patel et al. | |
| 7,984,006 B2 | 7/2011 | Price | |
| 8,010,669 B2 | 8/2011 | Sathish | |
| 8,060,406 B2 | 11/2011 | Blegen | |
| 8,095,523 B2 | 1/2012 | Brave et al. | |
| 8,103,729 B2 | 1/2012 | Tornabene et al. | |
| 8,135,718 B1 | 3/2012 | Das et al. | |
| 8,239,460 B2 | 8/2012 | Meek et al. | |
| 8,255,468 B2 | 8/2012 | Vitaldevara et al. | |
| 8,271,413 B2 | 9/2012 | Agarwal et al. | |
| 8,296,351 B2 | 10/2012 | Lazaridis et al. | |
| 8,307,029 B2 | 11/2012 | Davis et al. | |
| 8,428,614 B2 | 4/2013 | Wolfe | |
| 8,489,599 B2* | 7/2013 | Bellotti ............... | G06F 16/4393 707/736 |
| 8,499,047 B2 | 7/2013 | Weyer et al. | |
| 8,515,459 B2 | 8/2013 | Busch | |
| 8,549,013 B1 | 10/2013 | Sarma et al. | |
| 8,554,703 B1* | 10/2013 | Lin ........................ | G06N 20/00 706/12 |
| 8,589,494 B2 | 11/2013 | Garrett | |
| 8,595,234 B2 | 11/2013 | Siripurapu et al. | |
| 8,606,781 B2 | 12/2013 | Chi et al. | |
| 8,620,764 B2 | 12/2013 | Moritz et al. | |
| 8,676,929 B2 | 3/2014 | Lazaridis et al. | |
| 8,694,901 B2 | 4/2014 | Falchuk et al. | |
| 8,713,612 B2 | 4/2014 | Levy et al. | |
| 8,719,391 B2 | 5/2014 | Hämäläinen et al. | |
| 8,732,584 B2 | 5/2014 | Lee et al. | |
| 8,738,431 B2 | 5/2014 | Elliott et al. | |
| 8,868,472 B1* | 10/2014 | Lin ........................ | G06N 5/02 706/12 |
| 8,938,503 B2 | 1/2015 | Shoen et al. | |
| 9,015,099 B2 | 4/2015 | Nitz et al. | |
| 9,081,853 B2 | 7/2015 | Rao et al. | |
| 9,098,834 B2 | 8/2015 | Ramanathaiah et al. | |
| 9,137,190 B2 | 9/2015 | Nairn et al. | |
| 9,195,765 B2 | 11/2015 | Russell et al. | |
| 9,195,989 B2 | 11/2015 | Bosworth et al. | |
| 9,208,439 B2 | 12/2015 | Roberts et al. | |
| 9,245,010 B1 | 1/2016 | Donneau-Golencer et al. | |
| 9,245,238 B2 | 1/2016 | Mejia et al. | |
| 9,256,785 B2 | 2/2016 | Qvarfordt | |
| 9,280,911 B2* | 3/2016 | Sadeh-Koniecpol ....................... | H04L 63/1483 |
| 9,374,434 B2* | 6/2016 | Sylvain ............. | H04M 3/42374 |
| 9,467,530 B2 | 10/2016 | Belimpasakis et al. | |
| 9,589,560 B1* | 3/2017 | Vitaladevuni ........ | G06K 9/6277 |
| 9,691,073 B2 | 6/2017 | Tseng et al. | |
| 9,715,543 B2 | 7/2017 | Macadaan et al. | |
| 9,906,539 B2 | 2/2018 | Higbee et al. | |
| 10,095,988 B2 | 10/2018 | Tseng et al. | |
| 10,304,066 B2 | 5/2019 | Tseng et al. | |
| 10,330,440 B2 | 6/2019 | Lyren | |
| 10,394,919 B2 | 8/2019 | Reese et al. | |
| 2001/0032193 A1 | 10/2001 | Ferber | |
| 2002/0022516 A1 | 2/2002 | Forden | |
| 2002/0052781 A1 | 5/2002 | Aufricht et al. | |
| 2002/0082910 A1* | 6/2002 | Kontogouris ...... | G06Q 30/0257 705/14 |
| 2002/0098891 A1 | 7/2002 | Graham et al. | |
| 2002/0103698 A1 | 8/2002 | Cantrell | |
| 2002/0143802 A1 | 10/2002 | Chi et al. | |
| 2002/0164977 A1 | 11/2002 | Link, II et al. | |
| 2002/0173295 A1 | 11/2002 | Nykanen et al. | |
| 2003/0063072 A1 | 4/2003 | Brandenberg et al. | |
| 2003/0065731 A1* | 4/2003 | Mohammed ............ | H04L 41/28 709/208 |
| 2003/0229632 A1 | 12/2003 | Harris | |
| 2004/0012625 A1 | 1/2004 | Lei et al. | |
| 2004/0019603 A1 | 1/2004 | Haigh et al. | |
| 2004/0111477 A1 | 6/2004 | Boss et al. | |
| 2004/0199587 A1 | 10/2004 | McKnight | |
| 2004/0215509 A1 | 10/2004 | Perry | |
| 2005/0138049 A1 | 6/2005 | Linden | |
| 2005/0144000 A1 | 6/2005 | Yamasaki et al. | |
| 2006/0010240 A1 | 1/2006 | Chuah | |
| 2006/0109237 A1* | 5/2006 | Morita .................. | G16H 40/63 345/156 |

(56) References Cited

U.S. PATENT DOCUMENTS

| | | |
|---|---|---|
| 2006/0143278 A1 | 6/2006 | Bauchot et al. |
| 2006/0200523 A1 | 9/2006 | Tokuda et al. |
| 2006/0200834 A1 | 9/2006 | Cukierman et al. |
| 2006/0206578 A1 | 9/2006 | Heidloff et al. |
| 2007/0038777 A1 | 2/2007 | Low et al. |
| 2007/0124721 A1 | 5/2007 | Cowing et al. |
| 2007/0260596 A1* | 11/2007 | Koran ............... G06F 16/24578 |
| 2008/0039203 A1 | 2/2008 | Ackley |
| 2008/0040126 A1 | 2/2008 | Estrada et al. |
| 2008/0077569 A1 | 3/2008 | Lee et al. |
| 2008/0098420 A1 | 4/2008 | Khivesara et al. |
| 2008/0114639 A1 | 5/2008 | Meek et al. |
| 2008/0172363 A1 | 7/2008 | Wang et al. |
| 2008/0294617 A1* | 11/2008 | Chakrabarti ........ G06F 16/9535 |
| | | 707/999.005 |
| 2009/0077057 A1* | 3/2009 | Ducheneaut ........... G06Q 30/02 |
| 2009/0089288 A1 | 4/2009 | Petersen |
| 2009/0125321 A1 | 5/2009 | Charlebois et al. |
| 2009/0144272 A1 | 6/2009 | Adarsh et al. |
| 2009/0157828 A1 | 6/2009 | Agrawal |
| 2009/0177541 A1 | 7/2009 | Martel et al. |
| 2009/0224867 A1 | 9/2009 | O'Shaughnessy et al. |
| 2009/0234878 A1 | 9/2009 | Herz et al. |
| 2009/0234958 A1 | 9/2009 | Lee |
| 2009/0248819 A1 | 10/2009 | Hutchison et al. |
| 2009/0254971 A1* | 10/2009 | Herz ...................... G06Q 10/10 |
| | | 726/1 |
| 2009/0265764 A1 | 10/2009 | Schultz et al. |
| 2010/0036856 A1 | 2/2010 | Portilla |
| 2010/0262650 A1 | 2/2010 | Chauhan et al. |
| 2010/0064015 A1 | 3/2010 | Sacks et al. |
| 2010/0228582 A1 | 9/2010 | King et al. |
| 2010/0241464 A1* | 9/2010 | Amigo .................. A61B 5/1123 |
| | | 705/4 |
| 2010/0274628 A1 | 10/2010 | Kunz et al. |
| 2010/0299275 A1 | 11/2010 | Greenspan |
| 2011/0016161 A1 | 1/2011 | Loeb |
| 2011/0125678 A1* | 5/2011 | Partridge ............... G06N 20/00 |
| | | 706/12 |
| 2011/0138000 A1 | 6/2011 | Balasubramanian et al. |
| 2011/0302169 A1* | 12/2011 | Brdiczka ............... G06Q 30/02 |
| | | 707/740 |
| 2011/0320550 A1 | 12/2011 | Lawson et al. |
| 2012/0001919 A1 | 1/2012 | Lumer |
| 2012/0041969 A1* | 2/2012 | Priyadarshan ..... G06Q 30/0201 |
| | | 707/769 |
| 2012/0046966 A1 | 2/2012 | Chang et al. |
| 2012/0096114 A1 | 4/2012 | McColgan |
| 2012/0131020 A1 | 5/2012 | Nitz et al. |
| 2012/0135751 A1 | 5/2012 | Mishra |
| 2012/0166377 A1 | 6/2012 | Sathish et al. |
| 2012/0257733 A1* | 10/2012 | Kosseifi ........... G06Q 10/06311 |
| | | 379/93.17 |
| 2012/0278127 A1 | 11/2012 | Kirakosyan et al. |
| 2012/0278473 A1 | 11/2012 | Griffiths |
| 2012/0310587 A1* | 12/2012 | Tu ............................ G01D 1/16 |
| | | 702/181 |
| 2013/0009993 A1* | 1/2013 | Horseman ............... G16H 40/63 |
| | | 345/633 |
| 2013/0018954 A1 | 1/2013 | Cheng |
| 2013/0110992 A1 | 5/2013 | Ravindra et al. |
| 2013/0159100 A1 | 6/2013 | Raina et al. |
| 2013/0198197 A1 | 8/2013 | Sawhney et al. |
| 2013/0262216 A1* | 10/2013 | Zhang .................... G06Q 30/02 |
| | | 703/2 |
| 2013/0271454 A1* | 10/2013 | Lyons ................. G06F 3/04897 |
| | | 345/419 |
| 2013/0325970 A1* | 12/2013 | Roberts ............... H04N 21/4788 |
| | | 709/206 |
| 2014/0089048 A1 | 3/2014 | Bruich |
| 2014/0237595 A1* | 8/2014 | Sridhara .................. G06F 21/55 |
| | | 726/23 |
| 2014/0257540 A1* | 9/2014 | Pacione ................... G09B 19/00 |
| | | 700/91 |
| 2014/0280208 A1* | 9/2014 | McConky ......... G06F 16/24578 |
| | | 707/748 |
| 2014/0282257 A1* | 9/2014 | Nixon .................. G06F 3/04842 |
| | | 715/835 |
| 2015/0131850 A1* | 5/2015 | Qvarfordt ............... G06F 3/013 |
| | | 382/103 |
| 2015/0134612 A1* | 5/2015 | Silberstein .............. G06F 16/27 |
| | | 707/634 |
| 2015/0193695 A1* | 7/2015 | Cruz Mota ......... H04L 63/1425 |
| | | 706/12 |
| 2015/0262067 A1* | 9/2015 | Sridhara ................. H04L 63/14 |
| | | 706/12 |
| 2015/0289797 A1* | 10/2015 | Pacione ................ A61B 5/1112 |
| | | 600/301 |
| 2015/0324686 A1* | 11/2015 | Julian ...................... G06N 3/08 |
| | | 706/25 |
| 2016/0093154 A1* | 3/2016 | Bytnar ................. G07F 17/3237 |
| | | 463/25 |
| 2016/0119364 A1* | 4/2016 | Zolli ...................... G06Q 30/02 |
| | | 726/26 |
| 2016/0140481 A1* | 5/2016 | Huang ............. G06Q 10/06313 |
| | | 705/7.15 |
| 2016/0142435 A1* | 5/2016 | Bernstein ............ H04L 63/1441 |
| | | 726/23 |
| 2016/0283887 A1* | 9/2016 | Jagyasi ............. G06Q 10/06398 |
| 2016/0314627 A1* | 10/2016 | Fish ..................... H04L 65/1069 |
| 2016/0321616 A1* | 11/2016 | Gedge ..................... G06N 5/025 |
| 2016/0358065 A1* | 12/2016 | Gedge ..................... G06N 20/00 |
| 2016/0359993 A1* | 12/2016 | Hendrickson ........... H04L 51/32 |
| 2016/0379136 A1* | 12/2016 | Chen ..................... G06F 21/552 |
| | | 706/14 |
| 2017/0032248 A1* | 2/2017 | Dotan-Cohen ........ G06Q 30/02 |
| 2017/0126963 A1* | 5/2017 | Todasco ............. H04N 5/23218 |
| 2017/0140285 A1* | 5/2017 | Dotan-Cohen ......... H04W 4/02 |
| 2017/0163503 A1* | 6/2017 | Black ....................... G09B 7/00 |
| 2017/0177833 A1* | 6/2017 | Lewallen ........... G09B 19/0038 |
| 2017/0178024 A1* | 6/2017 | Kida ....................... G06N 20/00 |
| 2017/0187807 A1* | 6/2017 | Clernon .............. H04L 41/0806 |
| 2017/0279827 A1* | 9/2017 | Savalle ................... H04L 69/22 |
| 2017/0289769 A1* | 10/2017 | Ceker .................. G06F 16/9535 |
| 2017/0309196 A1* | 10/2017 | Vangala ................. G09B 19/00 |

FOREIGN PATENT DOCUMENTS

| | | |
|---|---|---|
| EP | 1 024 437 A2 | 8/2000 |
| EP | 1024437 A2 | 8/2000 |
| EP | 1850134 | 10/2007 |
| EP | 2523436 A1 | 11/2012 |
| JP | 2000112978 A | 4/2000 |
| WO | 0120481 A2 | 3/2001 |
| WO | 2006104345 | 10/2006 |
| WO | 2006104345 A1 | 10/2006 |
| WO | 2008113425 A1 | 9/2008 |
| WO | 2011019295 A1 | 2/2011 |
| WO | 2011140701 A1 | 11/2011 |
| WO | 2013059906 | 5/2013 |

OTHER PUBLICATIONS

Eivazi et al., "Predicting Problem-Solving Behavior and Performance Levels from Visual Attention Data," Feb. 13, 2012, 2nd Workshop on Eye Gaze in Intelligent Human Machine Interaction, pp. 9-16 (Year: 2012).

Ratwani et al., "A Real-Time Eye Tracking System for Predicting and Preventing Postcompletion Errors," Human-Computer Interaction, 2011, vol. 26, pp. 205-245 (Year: 2011).

Vo, C.C., Torabi, T., Loke, S.W. (2009). "Towards Context-Aware Task Recommendation," 2009 Joint Conferences on Pervasive Computing (JCPC). doi:10.1109/jcpc.2009.5420173 (Year: 2009).

Hastie et al., "Automatic Evaluation: Using a DATE Dialogue Act Tagger for User Satisfaction and Task Completion Prediction", 2002, Proc. Lang. Resources Eval. Conf, pp. 1-8 (Year: 2002).

Petition for Inter Partes Review of U.S. Pat. No. 8,489,599 including exhibits, 1,517 pages.

Petition for Inter Partes Review of U.S. Pat. No. 9,208,439 including exhibits (605 pages).

(56) References Cited

OTHER PUBLICATIONS

Callihan, "Learn HTML in a Weekend", Prima Publishing, 1998, available at: https://archive.org/deta ils/learnhtmlinweeke00call.
Kamba et al., "An interactive, personalized, newspaper on the WWW", Multimedia Computing and Networking, 1996.
Kamba et al., "Anatagonomy: a personalized newspaper on the World Wide Web", Intl J. Human Computer Studies, 1997, p. 789-803, vol. 46.
Bharat et al., "Personalized, interactive news on the Web", Multimedia Systems 6, 1997, 22 pages.
"Mapping a City's Rhythm—MIT Technology Review", MIT, retrieved from https://www.technologyreview.com/s/412529/mapping-a-citys-rhythm.
"ESRI's Geospatial Computer-Aided Dispatch", Dec. 2007, ESRI.
"Personalization & Discovery", Qualcomm.com, Sep. 15, 2008, retrieved from https://web.archive.org/web/20080915111528/http://www.qualcomm.com/products_services/mobile_content_services/personalization_discovery.html.
"Qualcomm Acquires Xiam Technologies Limited, Leading Provider of Wireless Content Discovery and Recommendations Technology", Xiam Technologies, Mar. 11, 2008, retrieved from https://web.archive.org/web/20080808140641/http://www.xiam.com/press/2008-03-11-QualcommXiam.shtml.
Abraham, "Business Intelligence from Web Usage Mining", PARC, 2003.
BallBug, 2010, available at www.ballbug.com.
Joachims et al., "WebWatcher: Machine Learning and Hypertext", Carnegie Mellon University, 1995, 5 pages.
Berendt et al., "Towards Semantic Web Mining", The Semantic Web — ISWC, ISWC 2002 Lecture Notes in computer Science, 2002.
Blogniscient, 2010, available at www.blogniscient.com.
BlogRunner, 2010, available at www.blogrunner.com.
Chirita et al., "PROS: A Personalized Ranking Platform for Web Search", AH 2004: Adaptive Hypermedia and Adaptive Web-Based Systems, 2004.
Cloudee, 2010, available at www.cloudrunnercom.
Daylife, 2010, available at www.daylife.com.
Loreto et al., "Known Issues and Best Practices for the Use of Long Polling and Streaming in Bidrectional HTTP", Internet Engineering Task Force, 2011.
Malik, "Using the iPhone to Mine for Gold & Sense", Gigaom.com, Jun. 9, 2008, retrieved from https://gigaom.com/2008/06/09/sense-networks-citysense.
Marmasse et all., "Safe & Sound: a Wireless Leash", Short Talk: Trust, Security & Safety, Apr. 5-10, 2003, pp. 726-727, CHI 2003: New Horizons, Ft. Lauderdale, USA.
Memeorandum, 2010, available at www.memeorandum.com.
Meyers et al., "The Downloader's Companion for Windows", Prentice Hall PTR, 1995.
Mladenic, "Using Text Learning to Help Web Browsing", Proceedings of The Ninth Int'l Conf. on Human-Computer Interaction, 2001.
Newcomb, "Yahoo SmartAds: Super-Targeted Display Ads", Search Engine Watch, Jul. 2, 2007, retrieved from https://www.searchenginewatch.com/2007/07/02/yahoo-smartads-super-targeted-display-ads/.
Paliouras et al., "PNS: A personalized news aggregator on the web", Intelligent Interactive Systems in Knowledge-based Environments, 2008.
Paliouras et al., "PNS: Personalized multi-source news delivery", International Conference on Knowledge- Based and Intelligent Information and Engineering Systems, 2006.
Pant et al., "Crawling the Web", Web Dynamics, 2004, Springer, Berlin, Germany.
Petersen et al., "PALLAS: Personalised Language Learning on Mobile Devices", Fifth IEEE International Conference on Wireless, Mobile, and Ubiquitous Technology in Education, 2006.
Pirolli et al., "Silk from a Sow's Ear: Extracting Usable Structures from the Web", Conference on Human Factors in Computing Systems (CHI '96), Apr. 13-18, 1996.
Pitkow et al., "Mining Longest Repeating Subsequences to Predict World Wide Web Surfing", Proceedings of USITS'99: The 2nd USENIX Symposium on Internet Technologies & Systems, 1999.
Ramakrishnan, "The PointCast Network", PointCast Inc., retrieved from https://dl.acm.org/doi/abs/10.1145/276304.276361.
Rao, "Placecast Brings Location-Based Shopping Alerts to Retailer Smartphone Apps", TechCrunch, Aug. 22, 2011, retrieved from https://techcrunch.com/2011/08/22/placecast-brings-location-based-shopping-alerts-to-smartphone-apps/.
Rodriguez, "RESTful Web Services: The Basics", IBM DeveloperWorks, 2008.
Seo et al., "Learning User's Preferences by Analyzing Web-Browsing Behaviors", Proceedings of the Fourth International Conference on Autonomous Agents, 2000.
Sharp et al., "Establishing Requirements for a Mobile Learning System", Mobileam Case Study 10.2, 2007.
Sharples et al., "Big Issues in Mobile Learning", Report of a Workshop by Kaleidoscope Network of Excellence Mobile Learning Initiative, 2006.
Sharples et al., "Towards a Theory of Mobile Learning", MLEARN, 2005.
TechMeme, 2010, available at www.techmeme.com.
Technorati, 2010, available at www.technorati.com.
Theobald et al., "Bingo! and Daffodil: Personalized Exporation of Digital Libraries and Web Sources", 2004.
Wortham, "How Grindr is Changing the Way We Connect", The New York Times Mar. 10, 2013, retrieved from https://bits.blogs.nytimes.com/2013/03/10/how-grindr-is-changing-the-way-we-all-connect/.
Yao et al., "PagePrompter: An Intelligent Web Agent Created Using Data Mining Techniques, Rough Sets and Current Trends in Computing," Third International Conference RSTC, 2002, pp. 506-513.
Yau et al., "A context-aware and adaptive learning schedule framework for supporting learners' daily routines", Second International Conference on Systems, 2007.
Yeung et al., "A proactive personalised mobile recommendation system using analytic hierarchy process and Bayesian network", J. Internet Serv. Appl. 2012, p. 195-214, retrieved from https://link.springer.com/article/10.1007/s13174-012-0061-3.
Zafra, "Yahoo! Steps Up Online Advertising with SmartAds", Search Engine Journal, Jul. 2, 2007, retrieved from https://www.searchenginejournal.com/yahoo-steps-up-online-advertising-with-smartads/5245/#close.
Zuckerman, "Convention Highlights 'Push' Software for Web Browers," Technology Cybertimes, New York Times, Feb. 16, 1996, retrieved from https://archive.nytimes.com/www.nytimes.com/library/cyber/week/1209software.html.
Petition for Inter Partes Review of U.S. Pat. No. 9,137,190 including exhibits (1018 pages).
Petition for Inter Partes Review of U.S. Pat. No. 8,606,781 including exhibits (1209 pages).
Petition for Inter Partes Review of U.S. Pat. No. 8,489,599 including exhibits (472 pages).
Petition for Inter Partes Review of U.S. Pat. No. 8,489,599 B2, including exhibits; 1,745 pages.
Petition for Inter Partes Review of U.S. Pat. No. 8,489,599 including exhibits, 600 pages.
Petition for Inter Partes Review of U.S. Pat. No. 9,208,439 including exhibits, 723 pages.
Petition for Inter Partes Review of U.S. Pat. No. 8,732,584 including exhibits, 432 pages.
Petition for Inter Partes Review of U.S. Pat. No. 7,043,475 including exhibits (1134 pages).
Petition for Inter Partes Review of U.S. Pat. No. 9,208,439 including exhibits, 773 pages.
Armstrong et al., "WebWatcher: A Learning Apprentice for the World Wide Web", 1995 AAAI Spring Symposium Information Gathering from Heterogenous, Distributed Environments, 1995.
Ben-Shaul et al., "Adding support for dynamic and focused search with Fetuccino", 1999.
Chen et al., "WebMate: A Personal Agent for Browsing and Searching", The Robotics Institute Carnegie Mellon University, 1997.

(56) References Cited

OTHER PUBLICATIONS

Diligenti et al., "Focused Crawling Using Context Graphs", Proceedings of the 26th VLDB Conference, 2000, 8 pages, Cairo, Egypt.
Freitag et al., "WebWatcher: Knowledge Navigation in the World Wide Web", AAAI Technical Report FS-95-03, 1995.
Hersovici et al., "The shark-search algorithm — An application: tailored Web site mapping", Computer Networks and ISDN Systems, 1998, vol. 30, Issues 1-7.
Joachims et al., "WebWatcher: A Tour Guide for the World Wide Web", CMU-CS-96, 1996.
Keenoy et al., "Personalisation of Web Search", Intelligent Techniques for Web Personalization IJCAI 2003 Workshop, 2003.
Kirk, "Microsoft buys mobile advertising company ScreenTonic", Computerworld, May 3, 2007, retrieved from https://www.computerworld.com/article/2544849/microsoft-buys-mobile-advertising-company-screentonic.html.
Lieberman et al., "Exploring the Web with Reconnaissance Agents", Communications of the ACM, 2001, vol. 44, No. 8.
Lieberman et al., "Lets Browse: A Collaborative Web Browsing Agent", IUI '99: Proceedings of the 4th International Conference on Intelligent User Interfaces, 1998, pp. 65-68.
Lieberman, "Autonomous Interface Agents", CHI 97, Mar. 22-27, 1997.
Lieberman, "Letizia: An Agent That Assists Web Browsing", IJCAI '95: Proceedings of the 14th Intl Joint Conf. on Artificial Intelligence, 1995, vol. 1.
Manber et al., "WebGlimpse—Combining Browsing and Searching", Usenix Technical Conference, 1997.
Mladenic, "Personal WebWatcher: Design and Implementation", Technical Report IJS-DP-7472, 1996.
Mladenic, "Text Learning and Related Intelligent Agents: A Survey", IEEE Intelligent Systems and Their Applications, 1999, pp. 44-54, vol. 14, Issue 4.
Mladenic, "Machine Learning for Better Web Browsing", AAAI Technical Report SS-00-01, 2000.
Olston et al., "ScentTrails: Integrating Browsing and Searching on the Web", ACM Transactions on Computer Human Interactions, 2003, pp. 1-21, vol. 10, No. 3.
Pazzani et al., "Adaptive Web Site Agents", Autonomous Agents and Multi-Agent Systems, 2002, Kluwer Academic.
Pazzani et al., "Identifying Interesting Websites", AAAI-96 Proceedings, 1996, pp. 54-61.
Pazzani et al., "Learning and Revising User Profiles: The Identification of Interesting Web Sites", Machine Learning, 1997, pp. 313-331, vol. 27.
Pazzani et al., "Machine Learning for User Modeling", User Modeling and User-Adapted Interaction, 2001, pp. 19-29, vol. 11.
Schwab et al., "Adaptivity through Unobtrusive Learning", Special Issue on Adaptivity and User Modeling, 2002.
Sugiyama et al., "Adaptive Web Search Based on User Profiles Constructed without Any Effort from Users", WWW 2004, 2004.
Wolber et al., "Exposing Document Context in the Personal Web", IUI '02: 7th International Conference on Intelligent User Interfaces, Jan. 13-16, 2002.
Wolber, "Navigating to Personal Web", JCDL Conference '04, 2004.
Yao et al., "PagePrompter: An Intelligent Agent for Web Navigation Created Using Data Mining Techniques", 2002.
"About Alarm Clock", Feb. 8, 2006, retrieved from https://web.archive.org/web/20060208031527/http://www.robbiehanson.com/alarmclock/index.html.
"About", Ad Revolver, Feb. 4, 2002, retrieved from https://web.archive.org/web/20020204042004/http://www.adrevolver.com:80/banner_manager/about.htm.
Advertiser Analytics, Twitter, Sep. 30, 2012, retrieved from https://web.archive.org/web/20120930215459/https:/business.twitter.com/en/advertise/analytics/.
Aun, "DoubleClick Aims to Give Deeper Insight into Rich Media Effecitveness", Click Z, Jan. 7, 2008, retrieved from https://www.clickz.com/doubleclick-aims-to-give-deeper-insight-into-rich-media-effectivness/58863/.
Beale et al., "Mobile Context Aware Systems: The Intelligence to Support Tasks and Effectively Utilise Resources", International Conference on Mobile Human-Computer Interaction, 2004, p. 240.
"CC/WC/WCP Detailed Specifications", Xerox Corporation, 2006, retrieved from https://www.office.xerox.com/latest/W55SS-01.pdf.
"Certified Products", Twitter, Mar. 7, 2013, retrieved from https://web.archive.org/web/20130307212611/https:/dev.twitter.com/programs/twitter-certified-products/products.
"Citysense", Sense Networks, Sep. 22, 2008, retrieved from https://web.archive.org/web/20080922000635/http://www.sensenetworks.com:80/citysense.php.
"Document Security Xerox CopyCentre/WorkCentre/WorkCentre Pro 232/238/245/255/265/275", Xerox Corporation, retrieved from https://www.office.xerox.com/latestW7XFS-03U.pdf 2006,.
"Doubleclick Inc.", Encyclopedia.com entry, retrieved from https://www.encyclopedia.com/economics/encyclopediasalmanacs-transcripts-and-maps/doubleclick-inc.
"FAQ", Ad Revolver, Feb. 4, 2002, retrieved from https://web.archive.org/web/20020204042401/http://www.adrevolver.com/banner_managerfaq.htm.
Froelich et al., "MyExperience: A System for in situ Tracing and Capturing of User Feedback on Mobile Phones", MobiSys '07, 2007, vol. 57.
"GNIP", Twitter, Dec. 14, 2012, retrieved from https://web.archive.org/web/20121214215529/https:/dev.twitter.com/programs/twitter-certified-products/gnip.
Hristova et al., "Ad-me: Wireless Advertising Adapted to the User Location, Device and Emotions," Proc. of the 37th HI Int'l Conf. on System Sciences, 2004, retrieved from http://citeseerx.ist.psu.edu/viewdoc/download;jsessionid=2CD78FA3E058EB3BD48812F5EA10553B?doi=10.1.1.129.2870&rep=rep1&type=pdf.
Loecher et al., "CitySense: multiscale space time clustering of GPS points and trajectories", Joint Statistical Meeting (JSM), 2009, retrieved from http://www1.cs.columbia.edu~jebara/papers/CitySense. JSM2009.pdf.
"New York State Department of Taxation and Finance, Office of Tax Policy Analysis Taxpayer Guidance Division, Advisory Opinion re: Petition No. 5050314A", Jun. 17, 2008, retrieved from https://www.tax.ny.gov/pdf/advisory_opinions/sales/a08_28s.pdf.
PIQ Customer, 2013, retrieved from https://web.archive.org/web/20130405063947/http://www.placeiq.com/products/piq-customer-piq-customer/.
"PIQ Segments", 2013, retrieved from https://web.archive.org/web/20130404211709/http://www.placeiq.com/products/piq-segments-piq-segments/.
"PlaceIQ—Shyenne Horras", 2012, retrieved from https://shyennehorras.com/tag/placeiq/.
"PlaceIQ Blog", 2013, retrieved from https://web.archive.org/web/20130413102103/https://www.placeiq.com/blog/.
"Privacy", 2012, retrieved from https://www.placeiq.com/privacy/.
"Two new features for self-service advertisers" Twitter, Sep. 11, 2012, retrieved from https://web.archive.org/web/20120911135519/httpladvertising.twittercom/2012/09/two-new-features-for-self-service.html.
"Targeting", Twitter, Mar. 7, 2013, retrieved from https://web.archive.org/web/20130307212103/https://business.twitter.com/targeting.
"The new Twitter Ads center", Twitter, Mar. 16, 2013, retrieved from https://web.archive.org/web/20130316005334/ httpladvertising.twittercom/2013/03/The-new-Twitter-Ads-center.html.
"The Streaming APIs", Twitter, Jan. 19, 2013, retrieved from https://web.archive.org/web/20130119212721/https://dev.twitter.com/docs/streaming-apis.
"Twitter Ads Full Service Analytics", Twitter, on Mar. 7, 2013, retrieved from https://web.archive.org/web/20130307212052/https:/business.twitter.com/products/analytics-full-service.
"Twitter Advertising: Introducing Keyword Targeting in Timelines", Twitter, Apr. 18, 2013, retrieved from https://web.archive.org/web/

(56) References Cited

OTHER PUBLICATIONS

20130418114422/http://advertising.twitter.com/2013/04/Introducing-Keyword-Targeting-in-Timeline.html.
Petition for Inter Partes Review of U.S. Pat. No. 8,489,599 including exhibits, 1,578 pages.
Petition for Inter Partes Review of U.S. Pat. No. 7,043,475 B2 including exhibits; 1,404 pages.
Banerjee et al., "Clickstream Clustering using Weighted Longest Common Subsequences", Proceedings of the Web Mining Workshop at the 1st Siam Conference on Data Mining, Apr. 5-7, 2001
Chi et al., "LumberJack: Intelligent Discovery and Analysis of Web User Traffic Composition", WEBKDD 2002—Mining Data for Discovering Usage Patterns and Profiles Conference, 2002. Web.
Chi et al., "Using Information Scent to Model User Information Needs and Actions on the Web", ACM SIGCHI Conference on Human Factors in Computing Systems, 2001.
Cooley, "Data Preparation for Mining World Wide Web Browsing Patterns", WebMiner, 1999.
Cooley, "Discovery of Interesting Usage Patterns from Web Data", WebSIFT, 1999.
Cooley, "Web Mining: Information and Pattern Discovery on the World Wide Web", WebMiner, 1997.
Heer et al., "Identification of Web User Traffic Composition using Multi-Modal Clustering and Information Scent", of the Workshop on Web Mining, SIAM Conference on Data Mining, 2001. Proceedings.
Hsu et al., "Ranking Comments on the Social Web", 2009 Int'l Conf. Computational Sci. & Engineering, 2009, vol. 4.
Kamba et al., "The Krakatoa Chronicle — An Interactive, Personalized, Newspaper on the Web", GVU Center Technical Reports, 1995.
Kosala et al., "Web Mining Research: A Survey", ACM SIGKDD Explorations Newsletter, 2000, vol. 2.
Maarek et al., "WebCutter: A System for Dynamic and Tailorable Site Mapping", 1998.
Mobasher et al., "Integrating Web Usage and Content Mining for More Effective Personalization", EC-Web 2000: Proceedings of the First International Conference on Electronic Commerce and Web Technologies, 2000.
Perkowitz, "Adaptive Web Sites: Automatically Synthesizing Web Pages", 1998.
Perkowitz, "Adaptive Web Sites: Conceptual Cluster Mining", 1999.
Perkowitz, "Towards Adaptive Web Sites: Conceptual Framework and Case Study", 2000.
Shahabi et al., "A Framework for Efficient and Anonymous Web Usage Mining Based on Client—Side Tracking", WebKDD 2001—International Workshop of Mining Web Log Data Across All Customer Touch Points, 2002.
Shahabi et al., "Knowledge Discovery from Users Web-Page Navigation", Proceedings of the Seventh International Workshop of Research Issues in Data Engineering. High Performance Database Management for Large-Scale Applications, 1997.
Shapira et al., "ePaper — the Personalized Mobile Newspaper", J. Am. Soc. Info. Sci. & Tech., 2009, vol. 60.
Sizov et al., "Bingo!: Bookmark-Induced Gathering of Information", Dec. 14, 2002.
Srivastava et al., "Web Usage Mining: Discovery and Applications of Usage Patterns from Web Dage", ACM SIGKDD, Jan. 2000.
Wang et al., "Unified relevance models for rating prediction in collaborative filtering", ACM Transactions on Information Systems, 2008.
Wang et al., "Unifying user-based and item-based collaborative filtering approaches by similarity fusion", Proceedings of the 29th annual international ACM SIGIR Conference on Research and Development in Information Retrieval, 2006.
Wasfi et al., "Collecting User Access Patterns for Building User Profiles and Collaborative Filtering", IUI '99: Proceedings of the 4th International Conference on Intelligent User Interfaces, Dec. 1998, ACM 1999.
Weiss, "A Hierarchical Netwrok Search Engine that Exploits Content-Link Hypertext Clustering", 1996.
Wu, "SpeedTracer: A Web Usage Mining and Analysis Tool", 1998.
Yan et al., "From User Access Patterns to Dynamic Hypertest Linking", Computer Networks and ISDN Systems, 1996.
Zabala et al., "Calvin: A Personalized Web-Search Agent based on Monitoring User Actions", GI Jahrestagung, 2001.
Zaiane et al., "Discovering Web Access Patterns and Trends by Applying OLAP and Data Mining Technology on Web Logs", Proceedings IEEE International Forum on Research and Technology Advances in Digital Libraries — ADL '98, 1998.
Cetintemel et al., "Self-Adaptive User Profiles for Large Scale Data Delivery", ICDE '00: Proceedings of the 16th International Conference on Data Engineering, 2000.
Chang et al., "Mining the World Wide Web: An Information Search Approach", The Kluwer International Series on Information Retreival, 2001.
Lazerow, "Twitter's Ads API is Here: So What and Now What?", Ad Age, Feb. 20, 2013, retrieved from https://web.archive.org/web/20130223013656/http:/adage.com/article/digitalnext/twitter-s-ads-api/239913/.
Millhollon et al., "Microsoft Internet Explorer 3.0 F", Coriolis Group, 1996, available at: https://archive.org/deta ils/microsoftinteme000 0mill/.
Sterling, "New SmartAds: The Future of Graphical Advertising at Yahoo", Search Engine Land, Jul. 2, 2007, retrieved from https://searchengineland.com/new-smartads-the-future-of-graphical-advertising-at-yahoo-11607.
"Vrettos et al., ""A Fuzzy Rule-Based Agent for Web Retrieval-Filtering""", WI 2001: WebIntelligence: Research and Development, 2001.".
Wang, "Beginning Programming for Dummies", 1999, IDG Books Worldwide, Inc.
"About Alarm Clock", Oct. 11, 2007, retrieved from https://web.archive.org/web/20071011022121/http://www.robbiehanson.com/alarmclock/index.html.
"About PlaceIQ", 2012, retrieved from https://www.placeiq.com/about-placeiq/.
"Alcatel-Lucent, 1020 Placecast partner on location-based mobile advertising", Marketing Dive, retrieved from https://www.marketingdive.com/ex/mobilemarketer/cms/news/advertising/3305.html.
"Analytics", Twitter, Mar. 7, 2013, retrieved from https://web.archive.org/web/20130307212005/https://business.twitter.com/products/analytics-self-service.
"Announcing the Twitter Ads API", Twitter, Feb. 23, 2013, retrieved from https://web.archive.org/web/20130223180647/http:/advertising.twitter.com/2013/02/announcing-twitter-ads-api_20.html.
"Doubleclick Inc.", Encyclopedia.com, retrieved from https://www.encyclopedia.com/economics/encyclopedias-almanacs-transcripts-and-maps/doubleclick-inc.
"Form 10-K", 2007, http://media.corporate-ir.net/media_files/NSD/DCLK/reports/10k99.pdf.
"Frequently Asked Questions", Oct. 11, 2007, retrieved from https://web.archive.org/web/20071011034339/http://robbiehanson.com/alarmclock/faq.html.
"Gender targeting for Promoted Products now available", Twitter, Oct. 28, 2012, retrieved from https://web.archive.org/web/20121028010012/http:/advertising.twitter.com/2012/10/gender-targeting-for-promoted-products.html.
"How Do You Advertise on Facebook?", Facebook, Nov. 11, 2011, retrieved from https://web.archive.org/web/20111111023735/http:/www.advertisementinfacebook.com/how-do-you-advertise-on-facebook.html.
"Measure your impact", Twitter, Mar. 7, 2013, retrieved from https://web.archive.org/web/20130307211901/https:/business.twittercom/measure-your-impact.
"Measurement", 2012, retrieved from https://www.placeiq.com/measurement/.
"More powerful tools for small business and self-service advertisers", Twitter, Mar. 21, 2013, retrieved from https://web.archive.org/web/20130321053415/http:/advertising.twitter.com/2013/03/More-powertul-tools-for-small-business-and-self-service-advertisers.html.

(56) References Cited

OTHER PUBLICATIONS

"MPOS AdSpace", Aug. 8, 2008, retrieved from https://web.archive.org/web/20080808140616/http://www.xiam.com/xiam.products.adspace.shtml.
"Nike + iPod Exercise", HowStuffWorks 2007, retrieved from https://electronics.howstuffworks.com/gadgets/fitness/nike-ipod.htm.
"Piq Conquest", 2013, retrieved from https://web.archive.org/web/20130405064340/http://www.placeiq.com/products/ piq-conquest-piq-conquest/.
"Pricing", Twitter, Mar. 7, 2013, retrieved from https://web.archive.org/web/20130307212012/https://business.twitter.com/products/pricing.
"Project Ringing in the Rain — Overview", MIT Media Lab, Jan. 2007, retrieved from https://www.media.mit.edu/projects/ringing-in-the-rain/overview.
"Proximity Overview", Gimbal Inc., 2013, retrieved from https://docs.gimbal.com/proximity_overview.html.
"PVR Capture Apr. 2013", 2013, retrieved from https://web.archive.org/web/20130411042334/http://www.placeiq.com/products/pvr.
"Quick Reference Guide", 2009, retrieved from https://silo.tips/download/quick-reference-guide-21.
"Rest API v. 1.1 Resources", Twitter, Mar. 25, 2013, retrieved from https://web.archive.org/web/20130325202324/https://dev.twittercom/docs/api/1.1.
"Rest API v1.1 Resources", Twitter, Dec. 14, 2012, retrieved from https://web.archive.org/web/20121214124240/https://dev.twitter.com/docs/api/1.1.
"Screen Shots", Oct. 11, 2007, retrieved from https://web.archive.org/web/20071011044752/http://robbiehanson.com/alarmclock/screenShots.html.
"Smarter Security Systems for Indian Banks", Business Wire India, Aug. 29, 2012, retrieved from https://www.businesswireindia.com/smarter-security-systems-for-indian-banks-32474.html.
"Sponsor Breakfast Presentation PlaceIQ", 2012, retrieved from https://www.slideshare.net/mediapostlive/place-q-25647368.
"ss1.jog", Oct. 11, 2007, retrieved from https://web.archive.org/web/20071011044752im_/http://robbiehanson.com/alarmclock/images/ss1.jpg.
"ss3.jpg", Oct. 11, 2007, retrieved from https://web.archive.org/web/20071011044752imihttp://robbiehanson.com/alarmclock/images/ss3.jpg.
"ss7.jpg", Oct. 11, 2007, retrieved from https://web.archive.org/web/20071011044752im_/http://robbiehanson.com/alarmclock/images/ss7.jpg.
"ss8.jpg", Oct. 11, 2007, retrieved from https://web.archive.org/web/20071011044752im_/http://robbiehanson.com/alarmclock/images/ss8.jpg.
"ss9.jpg", Oct. 11, 2007, retrieved from https://web.archive.org/web/20071011044752im_/http://robbiehanson.com/alarmclock/images/ss9.jpg.
"ss10.jpg", Oct. 11, 2007, retrieved from https://web.archive.org/web/20071011044752imihttp://robbiehanson.com/alarmclock/images/ss10.jpg.
"ss11.jpg", Oct. 11, 2007, retrieved from https://web.archive.org/web/20071011044752im_/http://robbiehanson.com/alarmclock/images/ss10.jpg.
"ss12.jpg", Oct. 11, 2007, retrieved from https://web.archive.org/web/20071011044752im_/http://robbiehanson.com/alarmclock/images/ss12.jpg.
"ss13.jpg", Oct. 11, 2007, retrieved from https://web.archive.org/web/20071011044752im_/http://robbiehanson.com/alarmclock/images/ss13.jpg.
"ss14.jpg", Oct. 11, 2007, retrieved from https://web.archive.org/web/20071011044752im_/http://robbiehanson.com/alarmclock/images/ss14.jpg.
"Twitter Ads self service", Twitter, Mar. 7, 2013, retrieved from https://web.archive.org/web/20130307211550/https:/business.twitter.com/products/twitter-ads-self-service.
"Twitter Advertising: New enhanced geo-targeting for marketers", Twitter, Sep. 14, 2012, retrieved at https://webarchive.org/web/20120914024230/http:/advertising.twitter.com/2012/09/new-enhanced-geo-targeting-for-marketers.html.
"What are Promoted Trends?", Twitter, Mar. 26, 2013, retrieved from https://web.archive.org/web/20130326131656/https:/support.twitter.com/articles/282142.
LiveJournal Source Code, LiveJournal, 1999.
"New Jersey Division of Criminal Justice's "Handling a Domestic Violence Call:In-Service Training for Police Dispatchers", May 8, 2003, New Jersey Division of Criminal Justice.".
e! Science News, 2010, available at www.esciencenews.com.
We Smirch, 2010, available at www.wesmirch.com.
Balabanovic et al., "FAB: Content-Based, Collaborative Recommendation", 1997, retrieved from https://web.archive.org/web/19971021223905/http://fab.stanford.edu:80/.
Chakrabarti et al., "Focused crawling: a new approach to topic-specific Web resource discovery", WWW '99 Proceedings of the Eighth International Conference on World Wide Web, 1999.
Forrest, "Citysense: Lets You Know What Everybody's Doing", Sense Networks, retrieved from https://web.archive.org/web/20080701034213/http://radaroreilly.com/archives/2008/ 06/citysense-reality-mining-iphone.html.
Lieberman, "Letizia: An Agent That Assists Web Browsing,", The Lieberary: Henry Lieberman's On-Line Library, etrieved from https://web.archive.org/web/20040426134417/http://web.media.mit.edu~lieber/Lieberary/Lieberary.html.
Mladenic, "Machine Learning Used by Personal Personal WebWatcher," Proceedings of ACAI-99 Norkshop on Machine Learning and Intelligent Agents, 1999.
WebMate website, retrieved from https://web.archive.org/ web/20010210064517/http://www.cs.cmu.edu/~softagents/webmate/Introduction.html.
"Bingo!: Bookmark—Induced Gathering of Information", PowerPoint, Dec. 14, 2002.
"Daffodil (Distributed Agents for User-Friendly Access of Digital Libraries): The Underlying Concepts", PowerPoint, Feb. 27, 2004.
"ScreenTonic-At a glance", ScreenTonic SA, Feb. 9, 2008, retrieved from https://web.archive.org/web/20080209135205/http://www.screentonic.com/at-a-glance1.htm.
"ss2.jpg", Oct. 11, 2007, retrieved from https://web.archive.org/web/20071011044752im_/http://robbiehanson.com/alarmclock/images/ss2.jpg.
"ss4.jpg", Oct. 11, 2007, retrieved from https://web.archive.org/web/20071011044752im_/http://robbiehanson.com/alarmclock/images/ss4.jpg.
"ss5.jpg", Oct. 11, 2007, retrieved from https://web.archive.org/web/20071011044752im_/http://robbiehanson.com /alarmclock/images/ss6.jpg.
"ss6.jpg", Oct. 11, 2007, retrieved from https://web.archive.org/web/20071011044752im_/http://robbiehanson.com/alarmclock/images/ss6.jpg.
"Stamp-Technology", ScreenTonic SA, Feb. 13, 2008, retrieved from https://web.archive.org/web/20080213054711/http://www.screentonic.com/stamp-technology.htm.
"Targeted Mobile Advertising", Nov. 21, 2008, retrieved from https://web.archive.org/web/20081121201849/http://www.xiam.com/xiam.solutions.targeted.advertising.shtml.
"What's New", Oct. 11, 2007, retrieved from https://web.archive.org/web/20071011034402/http://robbiehanson.com/alarmclock/whatsNew.html.
"Xerox Extensible Interface Platform (EIP)" Xerox Corporation, 2006, retrieved from https://www.comdatch/download/pictures/0e/rv3wgtpblgfwvuit5x53eaztpe9at5/eip_your_work_just_got_easier.pdf.
Facebook Website as it existed and was publicly available prior to the effective filed of the '190 patent, Facebook Inc., retrieved from www.facebook.com, 2004.
MyExperience, Jun. 1, 2007, retrieved from www.myexperience.sourceforge.net.
WebGlimpse Website, retrieved from https://web.archive.org/web/20000815205534/http://webglimpse.org:80/.
Bausch et al., "Flickr Hacks", O'Reilly, 2006.

(56) References Cited

OTHER PUBLICATIONS

Belqasmi et al., "RESTful Web Services for Service Provisioning in Next-Generation Networks: A Survey", IEEE communications Magazine, 2011, pp. 66-73, vol. 49, Issue 12.
Bogers, "Movie Recommendation using Random Walks over the Contextual Graph", Information Systems & Interactive Design; Royal School of Library and Information Science, 2010.
Collins, "The Little Book of Twitter", Michael O'Mara Books, 2009.
El-Bishouty et al., "PERKAM: Personalized Knowledge Awareness Map for Computer Supported Ubiquitous Learning", Educational Technology & Society, 2007, pp. 122-134, vol. 10, No. 3.
Fitton et al., "Twitter for Dummies", Wiley Publishing, Inc., 2009.
Giles, "How to Use Flickr: the Digital Photography Revolution", Thomson Course Technology PTR, 2006.
Guinard et al., "Towards the Web of Things: Web Mashups for Embedded Devices", WWW 2009, Apr. 20-24, 2009.
Lerman et al., "Social Browsing on Flickr", International Conference on Weblogs and Social Media, 2006.
Maia et al., "LOCCAM—Loosely Coupled Context Acquisition Middleware", 28th Annual ACM Symposium on Applied computing (SAC '13) (Mar. 18-22, 2013), 2013.
McFedries et al., "MySpace Visual Quick Tips", Wiley Publishing, Inc., 2006.
Pokraev et al., "Service Platform for Rapid Development and Deployment of Context—Aware, Mobile Applications", Jul. 11-15, 2005, IEEE International Conference on Web Services (ICWS'05), vol. 646.
Ricci, "Mobile Recommender Systems", Information & Technology Tourism, 2010.
Riggsby et al., "Mastering Lotus Notes and Domino 6", Sybex, 2003.
Schwinger et al., "Context-awareness in Mobile Tourism Guides — A Comprehensive Survey", 2005, Johannes Kepler Universität Linz, Technische Universität Wien.
Van Setten et al., "Context-Aware Recommendations in the Mobile Tourist Application COMPASS", Proceedings of the Adaptive Hypermedia and Adaptive Web—Based Systems, Third International Conference, and Lecture Notes in computer Science, 2004, pp. 235-244, vol. 3137, Springer-Verlag Berlin Heidelberg.
Verbert et al., "Context-Aware Recommender Systems for Learning: A Survey and Future Challenges", IEEE Transactions on Learning Technologies, 2012.
Vo et al., "A Survey of Context-Aware Recommendation Systems", Semantic Scholar, 2013.
Wancho, "Digest Message Format", 1990.
Wilkinson, "Flickr Mashups", Wiley Publishing, Inc., 2007.
Xiang et al., "Temporal Recommendation on Graphs via Long- and Short-term Preference Fusion", ACM KDD '10, Jul. 25-28, 2010.
Yao et al., "Personalized Recommendation on Multi-Layer Context Graph", 2013, Springer-Vering Berlin Heidelberg.
Zeff et al., "Advertising on the Internet", Robert Ipsen, 1999.
Zheng et al., "Collaborative Location and Activity Recommendations with GPS History Data", ACM International conference on World Wide Web, 2010, pp. 1029-1038.
"API Integration", Twitter, Feb. 9, 2012, retrieved from https://web.archive.org/web/20120209174437/https:/business.twitter.com/en/optimize/api/.
Collection of Flickr web pages publicly available on archive.org.
Collection of LiveJournal web pages publicly available on archive.org.
Collection of MySpace web pages publicly available on archive.org.
"Murder: Fast datacenter code deploys using BitTorrent", Twitter, Jul. 1, 2010, retrieved from https://blog.twittercom/engineering/en_us/a/2010/murder-fast-datacenter-code-deploys-using-bittorrent.html.
"Documentation", Twitter, Jul. 13, 2011, retrieved from https://web.archive.org/web/20110713041412/https://dev.twitter.com/docs/.
"Geo Developer Guidelines", Twitter, Jul. 13, 2011, retrieved from https://web.archive.org/web/201 10713045612/https://dev.twitter.com/terms/geo-developer-guidelines.
"GET geo/search", Twitter, Jul. 13, 2011, retrieved from https://web.archive.org/web/20110713042853/https://dev.twitter.com/docs/api/1/get/geo/search.
"GET Search", Twitter, Dec. 23, 2011, retrieved from https://web.archive.org/web/20111223105655/https:/dev.twitter.com/docs/api/1/get/search.
"History of the Rest & Search API", Twitter, Dec. 2, 2011, retrieved from https://web.archive.org/web/20111202041642/https/dev.twitter.com/docs/history-rest-search-api.
"Improving performance on twittercom",Twitter, May 29, 2012, retrieved from https://blog.twitter.com/engineering/en_us/a/2012/improving-performance-on-twittercom.html.
"Interest targeting: Broaden your reach, reach the right audience", Twitter, Aug. 30, 2012, retrieved from https://web. archive.org/web/20120831222534/http:/advertising.twitter.com/2012/08/interest-targeting-broaden-your-reach.html.
"Promoted Accounts", Twitter, Sep. 9, 2010, retrieved from https://web.archive.org/web/20101009232719/http:/support.twitter.com/articles/282154.
"Promoted Products: now more mobile", Twitter, Feb. 29, 2012, retrieved from https://web.archive.org/web/20120229030349/http:/blog.twitter.com/2012/02/promoted-products-now-more-mobile_html.
"Promoted Trends", Twitter, Oct. 10, 2010, retrieved from https://web.archive.org/web/20101010145232/https:/support.twitter.com/articles/282142.
"Promoted Tweets on mobile: more options, starting today", Twitter, Mar. 20, 2012, retrieved from https://web.archive.org/web/20120320192505/http:/advertising.twitter.com/2012/03/promoted-tweets-on-mobile-more-options.html.
"Start Advertising", Twitter, Feb. 6, 2012, retrieved from https://web.archive.org/web/20120206021953/https:/business.twitter.com/en/advertise/start/.
"Streaming API", Twitter, Dec. 2, 2011, retrieved from https://web.archive.org/web/20111202024242/https://dev.twitter.com/docs/streaming-api.
"Streaming API Concepts", Twitter, Dec. 2, 2011, retrieved from https://web.archive.org/web/20111202024252/https://dev.twitter.com/docs/streaming-api/concepts.
"Things Every Developer Should Know", Twitter, Dec. 2, 2011, retrieved from https://web.archive.org/web/20111202041631/https://dev.twitter.com/docs/things-every-developer-should-know.
"Twitter Advertising: New targeting adds greater relevant to your Promoted Tweets", Twitter, Jul. 22, 2012, retrieved from https://web.archive.org/web/20120722044622/http:/advertising.twitter.com/2012/07/new-targeting-adds-greater-elevance-to.html.
"Getting Started", Twitter, Jul. 13, 2011, retrieved from https://web.archive.org/web/20110713043554/https://dev.twitter.com/start.
"Twitter Blog: Hello World", Twitter, Apr. 16, 2010, retrieved from https://web.archive.org/web/20100416111723/http://blog.twitter.com/2010/04/hello-world.html.
"User Streams", Twitter, Dec. 2, 2011, retrieved from https://web.archive.org/web/20111202041744/https://dev.twitter.com/docs/streaming-api/user-streams.
"User Streams", Twitter, Jul. 12, 2012, retrieved from https://web.archive.org/web/20120712073356/https://dev.twitter.com/docs/streaming-apis/streams/user.
"5 Tips for Creating an Advertisement on Facebook", Facebook, Nov. 11, 2011, retrieved from https://web.archive.org/web/20111111002017/http://www.advertisementinfacebook.com/advertisement-for-facebook.html.
"Advertisement in Facebook Information", Facebook, Nov. 11, 2011, retrieved from https://web.archive.org/web/20111112062703/http:/www.advertisementinfacebook.com/index.html.
Albino, "GPS-tracking apps: Helicopter parenting or smart solution?", Today's Parent, Nov. 1, 2013, retrieved from https://www.todaysparent.com/family/gps-tracking-kids/.
"Bear Group's Experience With DoubleClick", 2007, https://www.beargroup.com/system-integrationstad-servers/doubleclick.

(56) References Cited

OTHER PUBLICATIONS

Bellotti et al., "Activity-Based Serendipitous Recommendations with the Magitti Mobile Leisure Guide", CHI 2008 Proceedings, 2008, pp. 1157-1166.

Coburn, "Gowalla for the iPad; Map Views and Consumption", May 1, 2010, the Next Web, retrieved from https://thenextweb.com/insider/2010/05/01/gowalla-Ipad-map-views-consumption/.

Curtiss et al., "Unicorn: A System for Searching the Social Graph", The 39th International Conference on Very Large Data Bases, Aug. 26-30, 2013, Facebook, Inc.

Dey et al., "CybreMinder: A Context-Aware System for Supporting Reminders", 2000, Georgia Tech, retrieved from https://www.cc.gatech.edu/projects/infosphere/papers/CybreMinder.pdf.

Downey, "Minority Report advertising is already here: privacy at CES 2013, day 1", Abine, Jan. 9, 2013, retrieved from https://www.abine.com/blog/201 3/privacy-at-ces-day-1/.

Gaudin, "New PARC software turns a cell phone into a personal assistant", Computerworld, Nov. 21, 2007.

Glinton, "From Grindr Team, a Meet-'N'-Greet App for the Rest", WBUR News, Dec. 12, 2011, retrieved from https://www.wbur.org/npr/143585501/from-grindr-tearn-a-meet-n-greet-app-for-the-rest.

Greene, "Smart Phone Suggests Things to Do", MIT Technology Review, Nov. 13, 2007, retrieved from https://www.technologyreview.com/2007/11/13/128685/smart-phone-suggests-things-to-da.

Harris, "How Does the Nike Plus Work?", Livestrong.com, 2006, retrieved from https://www.livestrong.com/article/533191-how-does-the-nike-plus-work/.

Hickman, "How I became a Foursquare cyberstalker", The Guardian, Jul. 23, 2010, retrieved from https://www.theguardian.com/technology/2010/jul/23/foursquare.

Kelly, "Business Models Based on Advertising", Technical Business, and Legal Dimensions of Protecting Children from Pornography on the Internet: Proceedings of a Workshop, 2002, retrieved from https://www.nap.edu/read/1 0324/chapter/17#105.

Kim, "Pebble watch: Smartwatch Review", PCMag, Dec. 7, 2016, retrieved from https://www.pcmag.com/ reviews/pebble-smartwatch.

Kovach, "How to Use Gowalla to Check-In With Foursquare", Business Insider, Dec. 3, 2010, retrieved from https://www.businessinsidercomTheres-a-tour-of-gowallas-latest-iphone-app-2010-12.

"Nike + iPod Experience Coming to a Gym Near You", Nike News, Mar. 4, 2008, retrieved from https://news.nike.com/news/nike-ipod-experience-corning-to-a-gym-near-you.

"Nike Plus Review", Video, YouTube, Feb. 29, 2012, retrieved from https://www.youtube.com/watch?v=CkyecA7z4es.

Patel, "Pebble Smartwatch Review", The Verge, Jan. 28, 2013, retrieved from https://www.theverge.com/2013/1/28/3924904/pebble-smartwatch-review.

Piquepaille, "A phone that tells you what to do", ZDNet, Nov. 14, 2007, retrieved from https://www.zdnet.com/article/a-phone-that-tells-you-what-to-do.

Prasad, "Magitti: the Intelligent Mobile Platform", Geospatial World, Nov. 24, 2010, retrieved from https://www.geospatialworld.net/article/magitti-the-intelligent-mobile-platform/.

"Ringing in the Rain: an Agent Based Weather Warning System", MIT, Jan. 2008, retrieved from alumni.media.mit.edu/~ccchang/RITR/RingingInTheRain.htm.

Saint, "What is Foursquare and How Do I Use it?", Business Insider, Jan. 28, 2010, retrieved from https://www.businessinsidercom/how-hit-location-based-social-app-foursquare-works-2010-1.

Schonfeld, "Liveblogging Facebook Advertising Announcement (Social Ads + Beacon + Insights)", Tech Crunch, Nov. 6, 2007, retrieved from https://techcrunch.com/2007/11/06/liveblogging-facebook-advertising-announcement/.

Stern, "Pebble Watch; Behind the Smartwatch Sensation", ABC News, Jul. 10, 2012, retrieved from https://abcnews.go.com/Technology/pebble-watch-smartwatch-iphone-android/story?id=16750944.

Stevens, "Nike + iPod Sports Kit review", CNET, Jan. 23, 2007, retrieved from https://www.cnet.com/reviews/nike-plus-ipod-sport-kit-review/.

Takeuchi et al., "An Outdoor Recommendation System based on User Location History", ubiPCMM, 2006, retrieved from https://citeseerx.ist.psu.edu/viewdoc/download?doi=10.1.1.91.813&rep=rep1&type=pdf.

"Advisory Opinion re: Petition No. S050314A", New York State Department of Taxation and Finance, Office of Tax Policy Analysis Taxpayer Guidance Division, 2008, retrieved from https://www.tax.ny.gov/pdf/advisory_opinions/sales/a08_28s.pdf.

Dickinson, "Why Gay Guys Love Using Grindr to Hook Up and Make Friends", Insider, Feb. 14, 2012, retrieved from https://www.businessinsider.com/why-gay-guys-love-using-grindr-to-hook-up-and-make-friends-2012-1.

"Facebook Unveils Facebook Ads", Facebook, Nov. 6, 2007, retrieved from www.about.fb.com/news/2007/11/facebook-unveils-facebook-ads/.

"Foursquare's 1st Pitch Deck", 2009, retrieved from https://www.slideshare.net/alkarmi/foursquare-1stpitch2009.

"Gimbal Rest API", Gimbal Inc., 2013, available at https://docs.gimbal.com/rest.html.

"Gowalla", Wikipedia, https://en.wikipedia.org/wiki/Gowalla.

"In Pictures: All about Foursquare", Forbes, Apr. 7, 2010, retrieved from https://www.forbes.com/2010/04/07/iphone-mobile-android-technology-data-companies-10-foursquare_slide.html?sh=6a70a35328a2.

"Magitti on the move", The Economic Times, English Ed., retrieved from https://economictimes.indiatimes.com/as-you-like-it/magitti-on-the-move/printarticle/2568170.cms.

Miami Staff, "Grindr Anyone?", Miami Herald, Mar. 26, 2010, retrieved from https://www.miamiherald.com/miami-comithings-to-do/article225856080.html.

Miller, "Take a Step Closer for an Invitation to Shop", New York Times, Feb. 22, 2010, retrieved from https://www.nytimes.com/2010/02/23/business/media/23adco.html.

"Nike+ SportBand User's Guide", 2008, retrieved from https://www.manualslib.com/manual/259083/Nike-NikePlus-Sportband.html.

"UK Carrier O2 Teams with Placecast for LBS Opt-In Marketing to a Million Consumers", Internet 2 Go, Oct. 14, 2010, retrieved from http://internet2go.net/news/carriers/uk-carrier-02-teams-placecast-lbs-marketing-million-consumers.

"Visa enhances fraud detection service for VisaNet processing platform", The PayPers, Jan. 20, 2011, retrieved from https://thepaypers.corn/cards/visa-enhances-fraud-detection-service-for-visanet-processing-platform--742952.

"Visa Strategy Manager Boosts Issuer Fraud Detection", Visa, Apr. 11, 2012, retrieved from https://usa.visa.com/about-visa/newsroonn/press-releases.releaseld.9101.html.

"Visa Transaction Alerts make North American debut", Nov. 17, 2009, retrieved from https://www.finextra.com/ pressarticle/31025/visa-transaction-alerts-make-north-american-debut.

Wattanajantra, "Nike+ GPS app for iPhone; Track runs without a sensor in your shoe", CNET, Sep. 8, 2010, retreieved from https://www.cnet.com/news/nike-gps-app-for-iphone-track-runs-without-a-sensor-in-your-shoe/.

"We've just made the "Places" screen smarted", retrieved from https://web.archive.org/web/20100531082001/http://blog.foursquare.com:80/post/589698188/weve-just-made-the-places-screen-smarter.

"Why Should You Advertise on Facebook?", Facebook, Nov. 11, 2011, retrieved from https://web.archive.org/web/20111111002041/http:/www.advertisementinfacebook.com/why-advertise-on-facebook.html.

Williams, et al., "Role of a Personal Assistant in Delivering Personalised Context-Aware Services to Young People", 2002, retrieved from https://citeseerx.ist.psu.edu/viewdoc/download?doi=10.1.1.11.8614&rep=rep1&type=pdg.

Young, "Getting the Message: How the Internet is Changing Advertising," Harvard Business School, retrieved at https://hbswk.hbs.edu/itern/getting-the-message-how-the-internet-is-changing-advertising.

(56) References Cited

OTHER PUBLICATIONS

Zee, "Foursquare who? 'Gowalla' might just be where it's at.", Gowalla, Sep. 22, 2009, retrieved from https://thenextweb.com/2009/09/22/square-gowalla/.

* cited by examiner

COMPUTER-IMPLEMENTED SYSTEM AND METHOD FOR DISTRIBUTED ACTIVITY DETECTION

FIELD

This application relates in general to determining context, and in particular to a computer-implemented system and method for distributed activity detection.

BACKGROUND

Contextual intelligence can provide an in-depth understanding of an individual's context, including actions performed by that individual. In turn, knowledge of an individual's context at a particular time can be used to anticipate a need of that individual and provide personalized recommendations. The ability to anticipate a user's needs and provide personalized recommendations can help businesses increase revenue, as well as customer satisfaction and customer base. For example, a user is determined to be walking near four different restaurants in downtown Seattle at 5:30 p.m. on a Saturday night. Based on the time and the user's location, as well as a history of the user's food likes and dislikes, one or more of the restaurants can be provided to the user as a recommendation for dining. Additionally, coupons or other discounts can also be provided with the recommendation.

Unfortunately, detecting fine-grained activities performed by an individual to provide accurate recommendations is demanding due to requiring the transmission and processing of large amounts of data, which are typically performed server side. However, detecting activities via models, using high-frequency data, is superior to models operating on data collected at lower frequencies. For instance, data collected at high frequencies for individual users better identifies subtle differences between signs of context expressed by different users and can detect small changes.

Therefore, there is a need for an approach to identifying user context via models based on high frequency data collected for each individual, while decreasing the amount of time and processing required by a server to identify the context. Preferably, the approach will offset some of the expense typically borne by the server and reduce an amount of data flowing to the server so that the server can support a large number of users, while still utilizing large amounts of high-frequency data.

SUMMARY

To ensure accurate detection of fine-grained activities for a large number of users, distributed activity detection can be performed. Contextual data is collected for a user via one or more mobile computing devices. Features are extracted from the data to generate a feature vector. The feature vector is then compared with one or more activity models stored on the mobile computing device and a similarity measure is determined for each model. If one of the models satisfies a predefined amount of similarity to the feature vector, an activity associated with that model is assigned. However, if none of the models satisfy the similarity, the user is requested to identify the activity being performed and the identified activity is transmitted to a server with the feature vector for training a new model. Once trained, the server transmits the new model to the mobile computing device for running.

An embodiment provides a computer-implemented system and method for distributed activity detection. Contextual data collected for a user performing an activity is processed on a mobile computing device. The mobile computing device extracts features from the contextual data and compares the features with a set of models using a predefined comparison function. Each model represents an activity. A confidence score is assigned to each model based on the feature comparison and the mobile computing device transmits the features to a server when the confidence scores for the models are low. The server trains a new model using the features and sends the new model to the mobile computing device.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Accurately identifying fine-grained activities can require large amounts of contextual data for each individual user. Generally, the data is transmitted from a collecting device, such as a mobile computing device to a server for detection of the activity. Processing and analyzing the data, on the server, for multiple individuals can be extremely time consuming and costly. To decrease the time and cost, smaller amounts of contextual data can be collected and processed for each individual. However, the use of smaller amounts of data can lead to less precise results for activity determination. Accordingly, a process for reducing the time and cost for processing using large amounts of data to identify activities is favored and can be performed by storing common activity models on a mobile device for fast detection, while sending data for an undetected activity to a server for training a new model. Subsequently, the model is then transmitted to the mobile device for later use.

Figure 1:
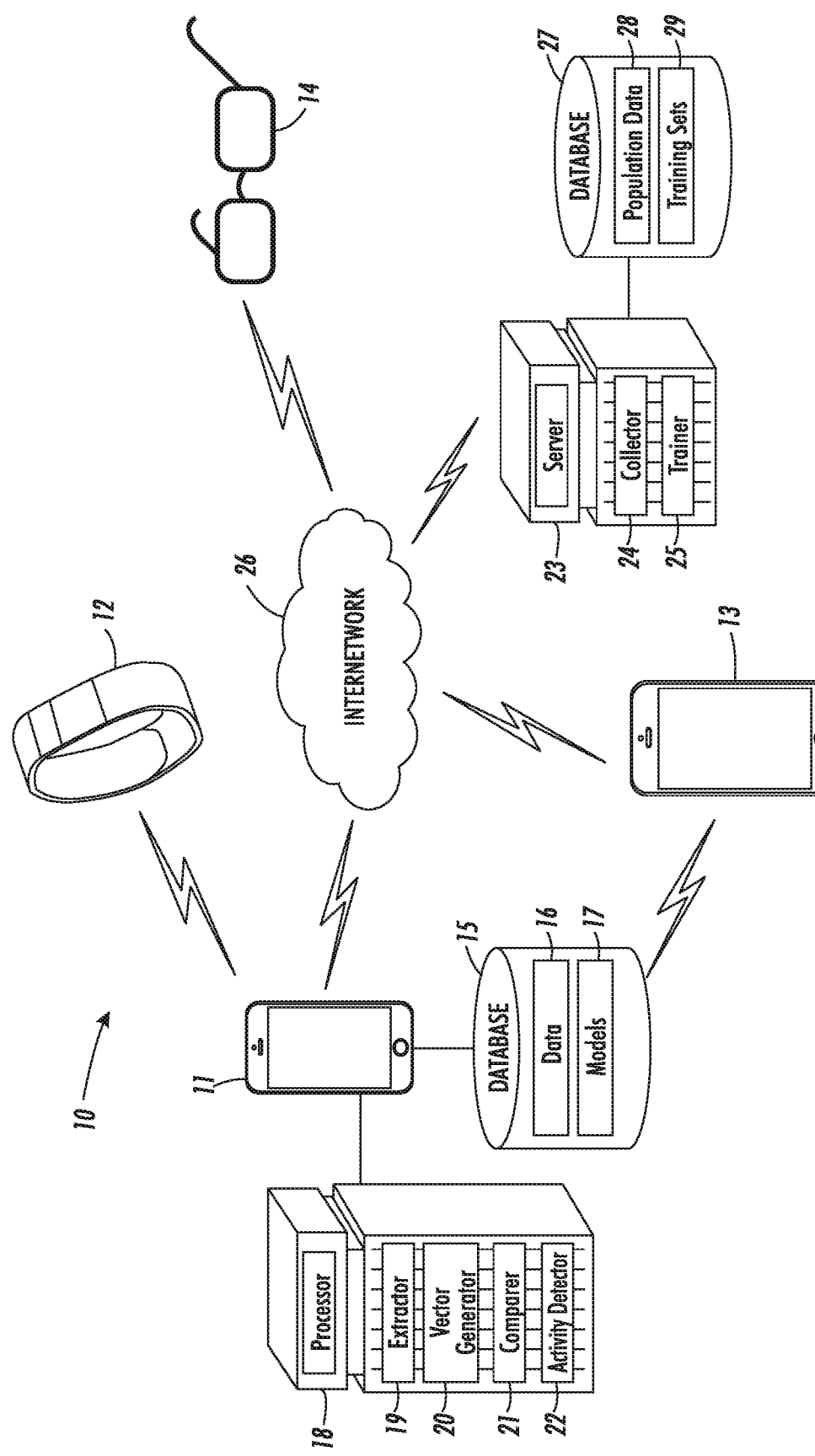
FIG. 1 is a block diagram showing a computer-implemented system for distributed activity detection, in accordance with one embodiment.

Distributed activity detection can decrease an amount of time needed for processing of large amounts of data, as well as reduce the amount of processing required by a server, which traditionally performs the activity detection. FIG. 1 is a block diagram showing a computer-implemented system 10 for distributed activity detection, in accordance with one embodiment. A user is associated with one or more mobile computing devices, such as a cell phone 11, smart watch 12, tablet 13, or a head-mounted computing device 14, such as Google Glass, by Google Inc. Each of the devices 11-14 can collect contextual data 16 for the user via one or more sensors during an activity being performed. The contextual data 16 can include location data, text messages, emails, photographs, video data, and acceleration data, as well as other types of data. The contextual data 16 can be stored on the respective computing devices, such as in a database 15 associated with that device, as well as transmitted to one or more other devices 11-14. The databases 15 can also store a set of models 17, wherein each model represents an activity. In one embodiment, one of the devices is selected as the main device on which the data will be processed. For example, each of the devices 12-14 sends their data to the cell phone 11 for analysis and activity determination. Alternatively, each device can analyze and process the contextual data 16 separately.

To analyze the contextual data, each device 11-14 can include a processor 18. The processor 18 can include an extractor 19, a vector generator 20, a comparer 21, and an activity detector 22. The extractor 19 performs feature extraction on the collected contextual data 16. Subsequently, the vector generator 20 generates a vector of the extracted features, and the comparer 21 compares the feature vector with each activity model 17 stored on that device, using a comparison function. The activity detector 22 identifies one of the models that most closely resembles the feature vector and that satisfies a predetermined amount of similarity. Subsequently, an identification label for the activity associated with the identified model is assigned to the feature vector representing the action performed by the user.

However, if the feature vector is not related to or similar to any of the models 17 stored on the mobile device 11-14, the mobile device prompts the user to provide a label, or identification, of the activity associated with the feature vector. In a further variation, the user can be prompted to label features at a later time, using, for example, a web-application. Once the feature vector is labelled, the mobile device or labelling application then transmits the label provided by the user and the feature vector to a server 23, such as via an internetwork 26, including the Internet. The server 23 can include a collector 24 and a trainer 25, and is interconnected to a database 27, which stores population data 28 and training sets 29. The collector 24 receives the feature vector and the activity label associated with the contextual from one or more of the mobile devices and/or feature labelers 11-14, and the trainer 25 utilizes the feature vector and activity label to train a new model that recognizes the activity associated with the feature vector. Subsequently, the new model is transmitted to one or more of the mobile computing devices for storing and use in identifying further activities performed by the user. Additionally, the model could optionally be transmitted to devices other than the user's devices.

The mobile computing devices 11-14 and server 23 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
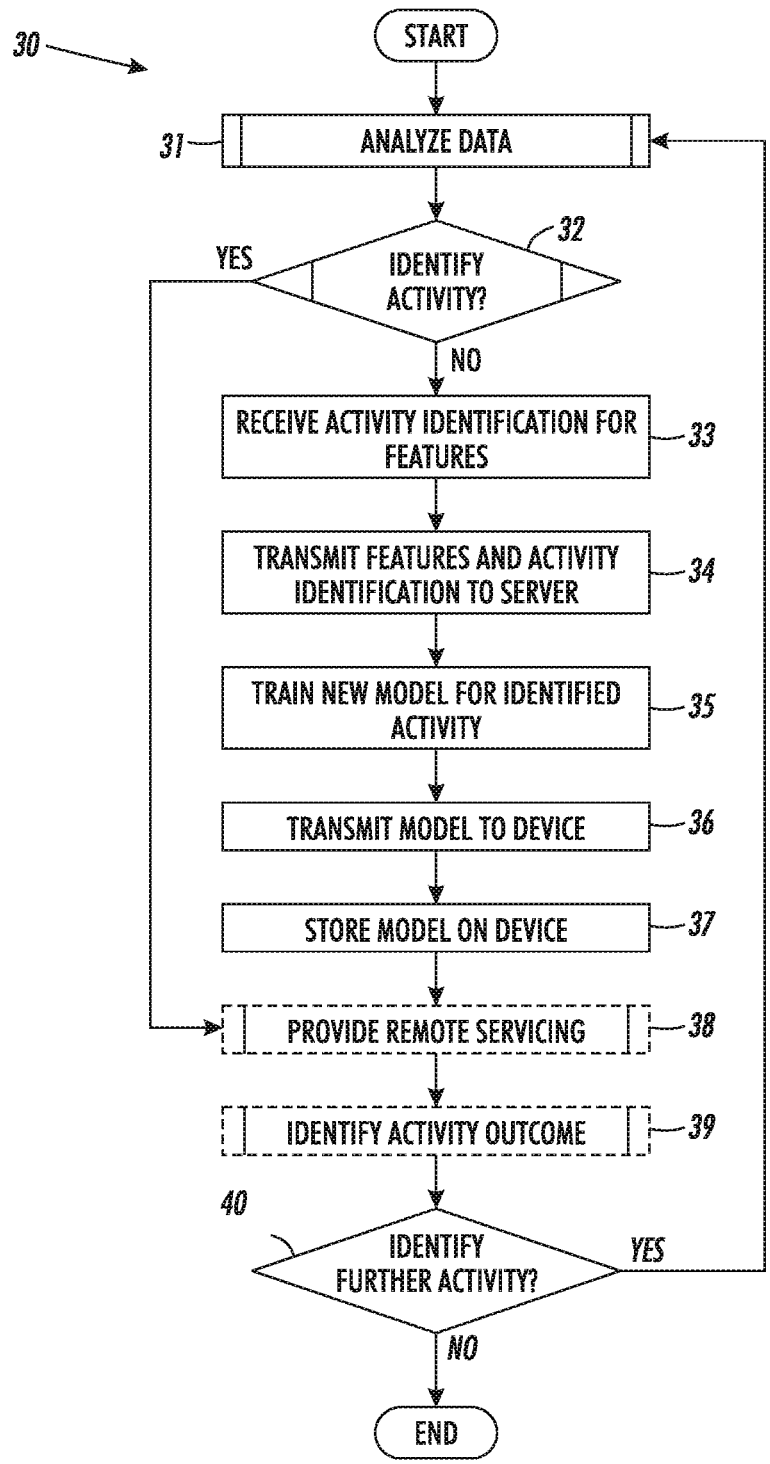
FIG. 2 is a flow diagram showing a computer-implemented method for distributed activity detection, in accordance with one embodiment.

Separating training of the activity models and activity detection can result in faster and more accurate detection by offsetting some of the processing generally required by a server. Once identified, the activities can be used to anticipate a need of a user and provide recommendations or assistance. FIG. 2 is a flow diagram showing a computer-implemented method 30 for distributed activity detection, in accordance with one embodiment. Contextual data associated with a user is analyzed (block 31) via one or more mobile devices in an attempt to identify (block 32) an activity being performed by the user. In one example, a user is travelling to downtown Seattle for a meeting and is carrying his cell phone. The cell phone collects location information of the user via GPS, accesses a calendar and identifies the meeting, which is scheduled from 2-4:30 p.m. and takes place at 500 Union Street. However, the accelerometer data indicates a reading of zero, GPS identifies that the user is located 2.5 miles from the meeting location, and a head-mounted computing device identifies that the user is outside of the car looking at the tires.

If the activity is identified (block 32), an activity identification label is assigned to the contextual data. In one embodiment, the assigned activity label can be provided to the user for confirmation, change, or feedback. Upon identification or confirmation of an activity, remote servicing can optionally be provided (block 38), as further described below with reference to FIG. 5, or an outcome of the identified activity being performed can optionally be predicted, as further described below with reference to FIG. 6.

If a label for the activity is not identified (block 32), the mobile device requests (block 33) the user to provide a label identifying the activity. In one embodiment, the user can receive the request as a notification on one of the associated mobile computing devices, for example, the mobile device that analyzed the contextual data. The notification can request that the user identify their current activity or confirm that they are still performing a previously identified activity. The user can identify his current activity by selecting an activity from a list of activities provided with the notification or by entering text for a label identifying the activity. In a further embodiment, the mobile computing device can consult a server-side directory of activities taking place, or having taken place, at the user's location to identify the activity being performed by the user. The server-side directory can be informed by the activities of other users at the location. In this way, the system can learn user-specific variations of activities commonly performed at particular locations.

Upon receipt of the activity label, the mobile device transmits (block 34) the contextual data and the activity label to a server. The server adds the contextual data and label to a training set and when the server has accumulated an appropriate amount of labeled activities, a new model can be trained (block 35) to recognize the labeled activity. An appropriate amount of labeled activities can be determined based on a threshold or on a predetermined number or range of labeled activities. Based on the training, the server generates a parametric description of the new model for sending (block 36) to the mobile computing device. Once received, the mobile computing device generates the new model, which is stored (block 37) for running on a persistent basis to identify any further performances of that activity by the user. Next, one or more recommendations can optionally be selected (block 38) and transmitted to the user based on the identified activity. Additionally, an outcome of the identified activity can optionally be predicted (block 39) based on the contextual data. Subsequently, a determination (block 40) is made as to whether further contextual data has been collected for identifying a further activity. If so, the further contextual data is analyzed (block 31) in an attempt to identify (block 32) the activity associated with the further contextual data. However, if no further contextual data remains for analysis, the process ends.

Returning to the above-identified example, no activity was identified for the collected contextual data of the stopped user looking at his car. The user receives a notification asking him what activity he is performing and the user responds via text that he is attempting to change a flat tire. The collected contextual data and the activity label provided by the user are sent to the server for training a new model. The new model is then transmitted to the mobile device for running to identify any further instances of the user performing a tire change. When a further instance of the user changing his tire is detected, contextually relevant servicing can be provided, such as by identifying and sending a recommendation to the user regarding changing a tire or by connecting the user with another user experienced in changing tires. In addition or in lieu of the contextually relevant servicing, an outcome of the tire changing activity can be predicted based on the contextual data collected from the user during the activity. Based on the predicted outcome, additional assistance may be provided to the user.

Figure 3:
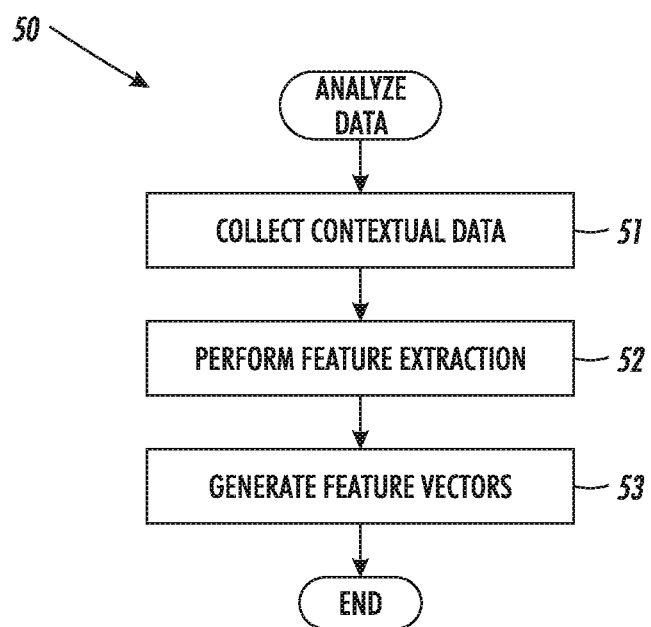
FIG. 3 is a flow diagram showing, by way of example, a process for analyzing contextual data.

Prior to determining an activity, the contextual data collected is analyzed. FIG. 3 is a flow diagram showing, by way of example, a process 50 for analyzing contextual data. One or more mobile devices associated with a user can collect (block 51) contextual data during the performance of an activity by a user, such as via GPS, an accelerometer, camera, voice recorder, email, telephone calls, and text messaging. The contextual data can include accelerometer readings, location data, pictures, sound recordings, temperature, and time, as well as other types of data that can be collected or determined via a mobile computing device.

Once the contextual data has been collected, the mobile device performs (block 52) feature extraction on the data to identify features that are representative of the data. Feature extraction can be performed based on the type of contextual data being processed. For example, an FFT histogram can be computed for the accelerometer readings of the device to indicate how much energy exists at each point along a spectrum, a light sensor reading can be quantized to a normalized 0-1 value, a set of running applications on the device can be analyzed and identified, and readings from the GPS sensor can be clustered to detect significant locations. Additionally, meetings and times can be extracted from a calendar, identities of people or locations can be identified from text messages and emails, and location with respect to an object or structure can be determined via video or photograph data. Other types of examples for extracting features from the contextual data are possible.

The extracted features are then used to generate (block 53) a feature vector. Each extracted feature can represent a single dimension, such that the feature vector has a dimensionality equal to the number of features extracted from the contextual data for the activity associated with the vector. The feature vectors for different activities can be represented in a feature space, which is non-linear. The feature space provides an indication of relation between two or more of the activities represented by the feature vectors. Some of the activities can be separated from other activities by a large Euclidian or Cosine distance, while the separation for other activities is smaller. Upon determination, the feature vector can then be used in an attempt to identify the activity represented via activity models or to train a new activity model, if the activity cannot be identified.

Figure 4:
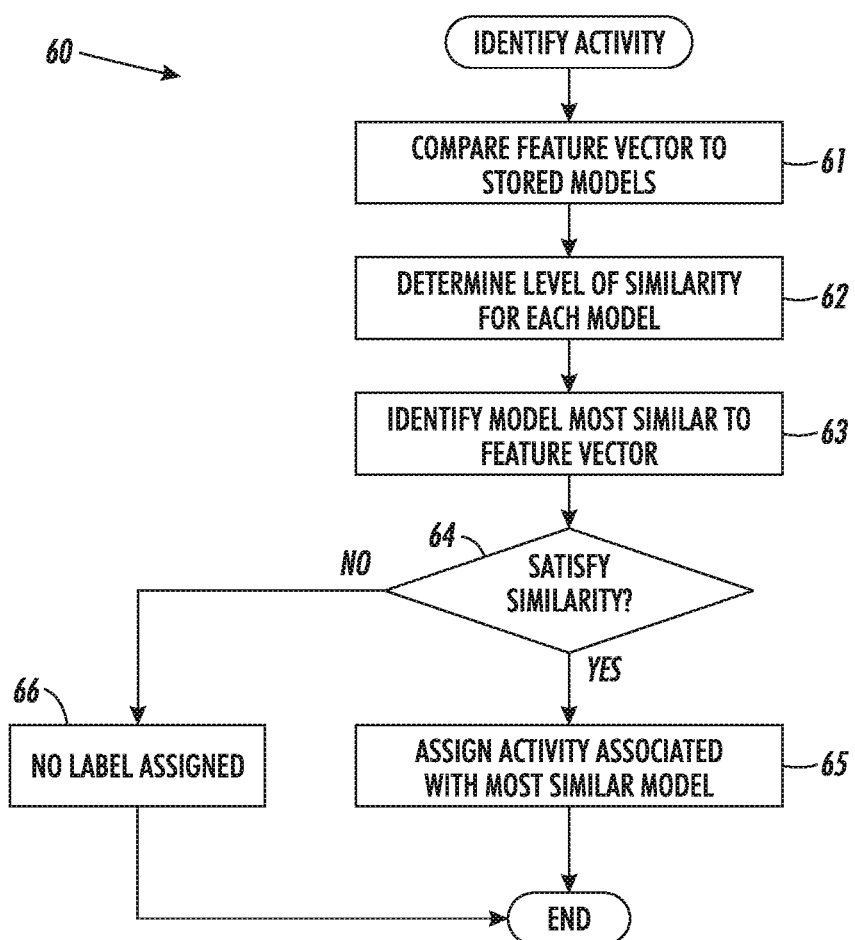
FIG. 4 is a flow diagram showing, by way of example, a process for identifying an activity.

Activity detection is first attempted on a mobile computing device to increase the speed and accuracy of the activity determination by preventing unnecessary transfers of large amounts of data to a server for analysis. FIG. 4 is a flow diagram showing, by way of example, a process 60 for identifying an activity on a mobile computing device. The feature vector is compared (block 61) with activity models stored on the mobile computing device. Each activity model can be first trained on a server to recognize a particular activity or a set of activities and then, transferred to the mobile computing device. In one embodiment, the initial activity models provided to the mobile computing device of a user can be trained using population data, models from other users, or models generated via a different method for the user. When sufficient amounts of contextual data have been collected for the user of the mobile computing device, the initial models can then be supplemented or replaced with the user specific models that are generated based on actions of the user. In a further embodiment, training can occur using a combination of labeled population data indexed by activity labels and the user's specific data. The two types of data can be weighed evenly or a higher weight can be assigned to either the population data or the user's specific data.

Model training can be performed on a server, and the same or different machine learning techniques for generating models can be used for different activities. In one embodiment, a parametric Support Vector Machine (SVM) model can be used; however, other types of machine learning are also possible, for example, Tensor representations. Training can occur by the server at any time, or alternatively, the load of the server can be monitored and training can occur at times when the server is less loaded. Additionally, training can be scheduled at times when the server is typically known to be less loaded. If multiple models exist for an activity, the server can automatically select which model to send to the mobile computing device for running.

For each comparison of the feature vector and an activity model, a level of similarity can be determined using some specific function (block 62). The similarity can be determined as a value or as a probability that a particular activity model supports the feature vector. In one example, the activity model with the highest similarity value or probability value can be selected (block 63) as representative of the feature vector. However, in addition to, or in lieu of, determining a highest value or probability, a threshold can be applied to determine whether model associated with the highest value or probability satisfies (block 64) a required amount of similarity to ensure that that the activity is an accurate representation of the feature vector. Use of the threshold prevents a model from being selected merely because the model has the highest similarity to the feature vector, when the model is truly not a good representation of the feature vector. Alternatively, a range of similarity or probability can be used in lieu of the threshold.

If the level of similarity is satisfied by a model, a label of the activity associated with that model is selected and assigned (block 65) to the feature vector. Once assigned, the activity label can optionally be provided to the user for confirmation or for relabeling with a different activity or different label for the activity. Relabeling of the activity can prompt retraining of the models via the server.

However, if the level of similarity is not satisfied, no activity labels are assigned (block 66) to the feature vector. As described above with reference to FIG. 2, those feature vectors, for which an activity cannot be identified by a mobile computing device, are sent to a server with activity labels provided by the user, for training a new model by generating parametric data. Subsequently, the parametric data for the new model is transmitted from the server to the mobile computing device for generating the new model and use in identifying further occurrences of the associated activity.

Figure 5:
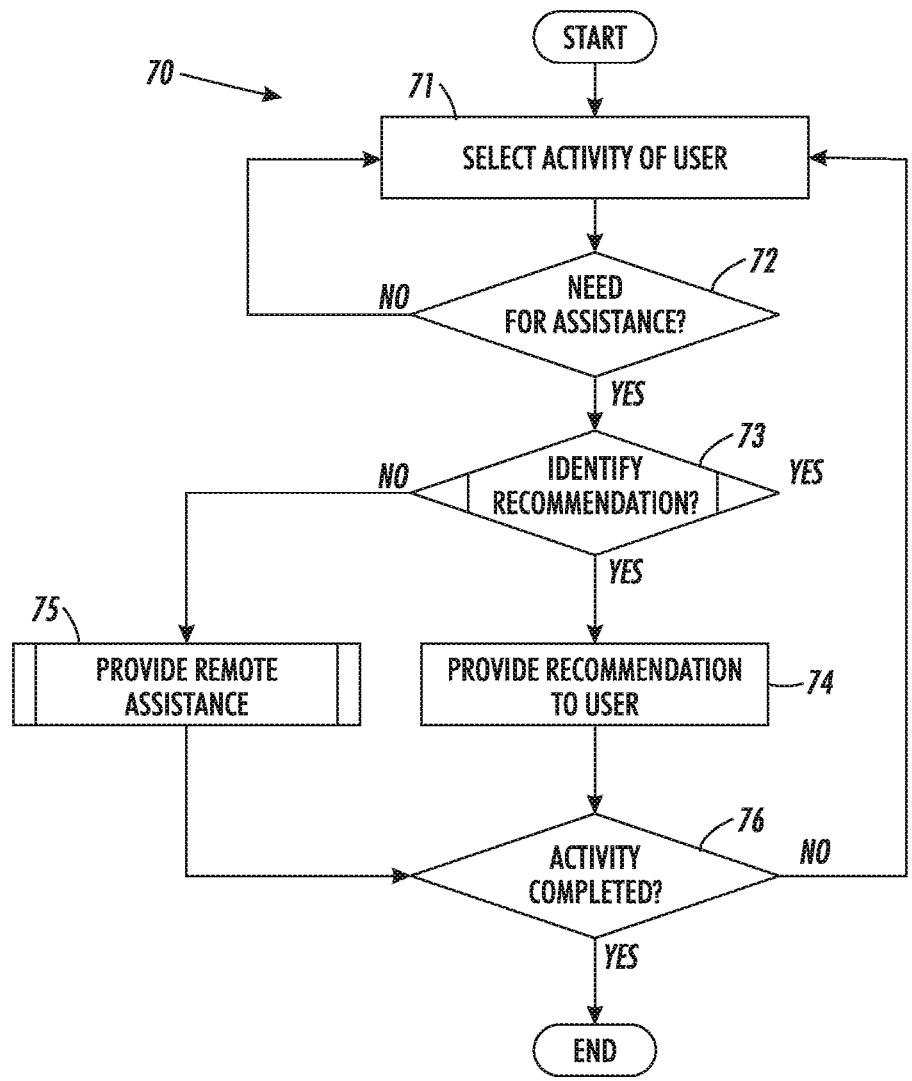
FIG. 5 is a flow diagram showing, by way of example, a process for providing remote servicing.

Once an activity performed by the user is identified, the activity can be used to provide contextually relevant servicing to the user, including offering recommendations and remote assistance, if needed. FIG. 5 is a flow diagram showing, by way of example, a process 70 for providing remote servicing. In one embodiment, a customer requiring servicing can submit a request to a service provider via a telephone call, Instant Messaging, SMS text messaging, or email. The request can include a service to be performed along with the customer's name, address, and customer number. Other data items for inclusion in the request are possible. Alternatively, the need for servicing can be inferred based on the user's context, including activity being performed, or can be automatically offered.

An identified activity being performed by the user is selected (block 71) and used to determine or anticipate (block 72) a need for assistance by the service provider. If no need for help exists (block 72), a further activity is selected (block 71) to determine if and when assistance can be provided. However, if help or advice would be necessary or useful to the user, one or more recommendations can be identified (block 73) and provided (block 74). The recommendations can each be selected based on identifying tasks commonly performed during the identified activity or a related activity by prior users. However, if no recommendations can be identified to fulfill the users need, remote assistance (block 75) can be provided via initiating communication with a knowledgeable individual to assist the user.

Upon providing a recommendation or remote assistance, a determination is made as to whether the user has completed (block 76) the activity. If so, then the context-based service optimization ends until another activity is selected. Alternatively, a context of the user continues to be monitored until the activity is completed. Remote servicing is further described in detail in commonly-owned U.S. patent application Ser. No. 15/203,752 entitled "Computer-Implemented System and Method for Providing Contextually Relevant Servicing," filed on Jul. 6, 2016, pending, the disclosure of which is incorporated by reference.

Figure 6:
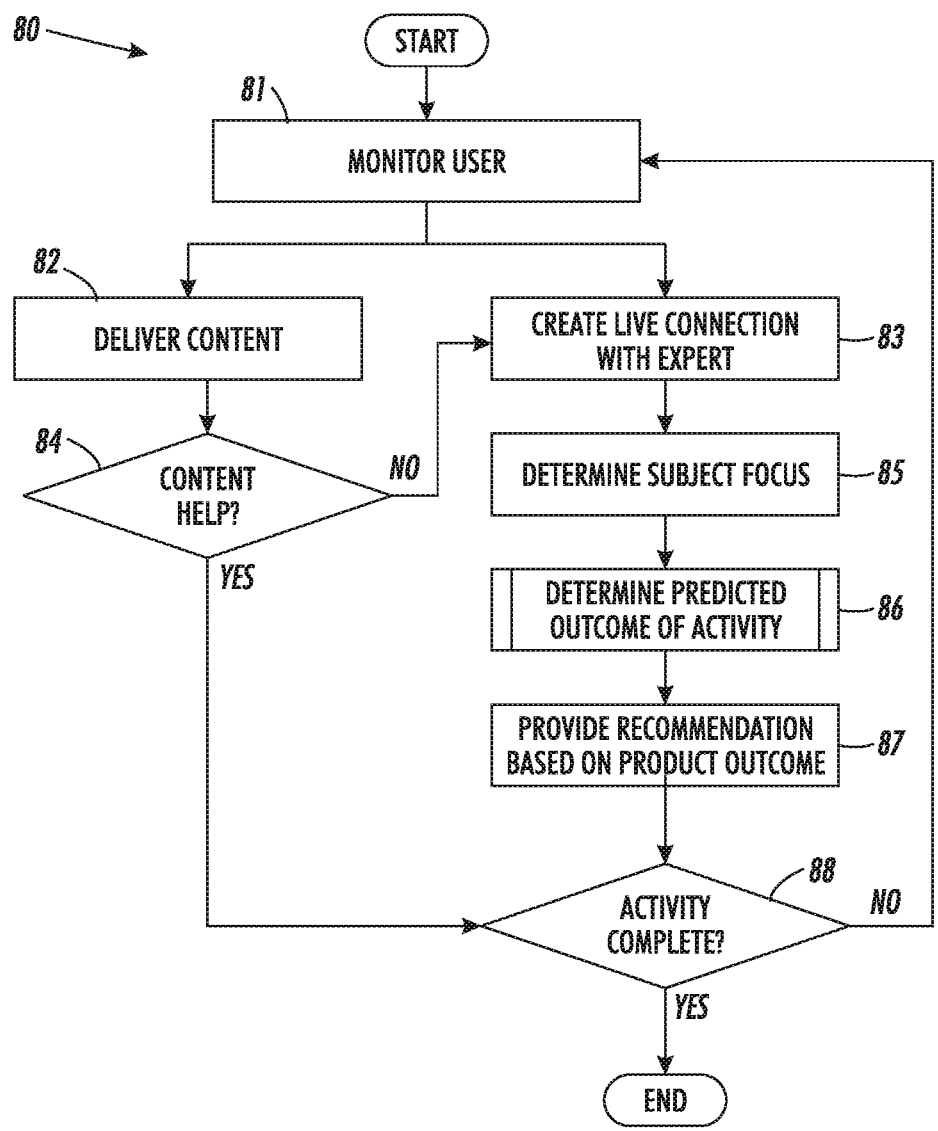
FIG. 6 is a flow diagram showing, by way of example, a process for predicting activity outcome.

Additionally, upon determination of an activity, an outcome of that activity can optionally be predicted. FIG. 6 is a flow diagram showing, by way of example, a process 80 for predicting activity outcome. Monitoring of the user commences (block 81) after identifying the activity being performed by a user. Based on the activity, servicing materials can be delivered (block 82) to the user to assist with the activity being performed. Alternatively, remote assistance can be performed (block 83) by the connecting the user with an expert for live assistance.

If servicing material is sent (block 82) to the user, a determination (block 84) is made as to whether the servicing material is helpful to the user or whether the user requires additional assistance. If the servicing material is helpful, and no further assistance is necessary, a determination (block 88) is made as to whether the activity has been completed and if so, no further monitoring of the user is required for that particular activity, but monitoring may continue until the service is completed. However, if the activity has not been completed (block 88), further monitoring of the user is performed (block 81).

When the user requires further assistance, in addition to the servicing material, or in lieu of the servicing material, remote assistance can be initiated (block 83) to connect the user with a live expert or individual with knowledge or expertise of the activity or need of the user. During remote assistance, contextual data of the user is obtained and used to determine a subject of focus (block 85) of the user. Subsequently, an outcome of the activity performed by the user can be predicted (block 86) using the subject of focus. The outcome can include a positive outcome, neutral outcome, or negative outcome with respect to completion of the activity.

Based on the predicted outcome, a relevant recommendation can be identified and provided (block 87) to the user to ensure that the user successfully completes the activity. The recommendation can include servicing material, such as reference materials, training manuals, or step-by-step instructions, as well as helpful hints or tips, and examples. The recommendation can be selected based on the activity being performed, the subject of focus of the user, and the predicted outcome of the activity. Finally, a determination (block 88) is made as to whether the activity has been successfully completed. If so, then the process ends and no further monitoring of the user is required since the service requested has been fulfilled. However, if further activities remain, monitoring of the user continues (block 81). Predicting an outcome of the activity is further described in detail in commonly-owned U.S. patent application Publication, Ser. No. 2018/0012126, published on Jan. 11, 2018, the disclosure of which is incorporated by reference.

In addition to providing contextually relevant servicing and predicting an activity outcome to provide further assistance, a group of qualified individuals can be identified for assisting the user in person, unlike remote assistance, as described in further detail in commonly-owned U.S. patent application Publication, Ser. No. 2018/0012170, published on Jan. 11, 2018, the disclosure of which is incorporated by reference. For instance, a user is identified as performing protein purification in which a hazardous chemical is used. The user is continually monitored throughout the purification process and further activities of the user are identified, including the user spilling the hazardous chemical. Based on the spill action, a recommendation is provided to the user to leave the room without cleaning the spill since the user is not experienced in cleaning chemical spills. Further, a group of individuals with knowledge and experience regarding proper chemical cleaning are identified and notified of the spill. One or more of the individuals can offer to or be selected to clean the spill.

The identified activities can be used to generate a lifelog for a user, which can include each identified activity with a date and time performed, as well as location and outcome of the activity. The lifelog can be tracked via a mobile application and accessible to the user and any other authorized individuals associated with the user. In a further embodiment, the activities can be used for ethnographic introspection as a chart or a scrollable interactive display.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for distributed activity detection, comprising:
   a server comprising a hardware processor to train models;
   at least one of a mobile computing device and a sensor device to:
   process contextual data for a user performing an activity;
   extract features from the contextual data;
   compare the features with one or more of the models from the server and stored on the mobile computing device, wherein each model represents an activity;
   assign a confidence score to each model based on the comparison with the features, wherein the confidence score comprises a probability that model matches the features;
   receive from a user of the mobile computing device or sensor device an identifier for the features only when the confidence scores for a match of the features with each of the models are low;
   transmit the identifier and features to the server only when the confidence scores for a match of the features with each of the models are low; and
   the server to:
   receive from the mobile computing device or sensor device, the features and the identifier on the server only when the confidence scores for each model are low,
   train a new model on the server using the received features and the identifier; and
   send the new model to the mobile computing device or the sensor device,
   wherein providing the features and the identifier from the mobile computing device or sensor device to the server only when the confidence scores are low offsets processing expense of the server by performing activity detection on the mobile computing device or sensor device and training of new activity models on the server.

2. A system according to claim 1, wherein the mobile computing device further extracts further features from additional contextual data received, compares the further features generated from a set of stored models, assigns a confidence score to each model based on the comparison with the features, and assigns the activity associated with the model having the highest confidence score to the activity being performed by the user.

3. A system according to claim 2, wherein the mobile computing device further receives from the user an assignment of a different activity for the further features to replace the assigned activity associated with the model having the highest confidence score.

4. A system according to claim 1, wherein the mobile computing device further adds the new model to the models stored on the mobile computing device.

5. A system according to claim 1, wherein the mobile computing device further generates vectors for the features, wherein the vectors of the features are compared with the models on the mobile computing device.

6. A system according to claim 1, wherein the mobile computing device further transmits a request to the user of the mobile computing device to identify at least one of the activity being performed and the activity still being performed.

7. A system according to claim 6, wherein the request comprises a list of activities for selection by the user as the identifier of the activity.

8. A system according to claim 6, wherein the mobile computing device further receives from the user a typed identity of the activity as the identifier.

9. A system according to claim 1, further comprising:
   training the new model on the server using a combination of labeled population data indexed by activity label and the user's specific contextual data.

10. A system according to claim 1, wherein the feature extraction depends on a type of the contextual data.

11. A computer-implemented method for distributed activity detection, comprising:
    processing on a mobile computing device contextual data for a user performing an activity;
    extracting features from the contextual data via the mobile computing device;
    comparing the features with a set of models from a server and stored on the mobile computing device, wherein each model represents an activity;
    assigning a confidence score to each model based on the comparison with the features, wherein the confidence score comprises a probability that model matches the features;
    receiving from a user of the mobile computing device an identifier for the features only when the confidence scores for a match of the features with each of the models are low;
    transmitting the identifier and features from the mobile computing device to the server only when the confidence scores for a match of the features with each of the models are low;
    receiving the features and the identifier from the mobile computing device on the server only when the confidence scores for each model are low;
    training a new model on the server using the features; and
    sending from the server, the new model to the mobile computing device,
    wherein providing the features and the identifier from the mobile computing device to the server when the confidence scores are low offsets processing expense of the server by performing activity detection on the mobile computing device and training of new activity models on the server.

12. A method according to claim 11, further comprising:
    extracting further features from additional contextual data received;
    comparing the further features with the set of models stored on the mobile computing device;
    assigning a confidence score to each model based on the comparison with the features; and
    assigning the activity associated with the model having the highest confidence score to the activity being performed by the user.

13. A method according to claim 12, further comprising:
    receiving from the user an assignment of a different activity for the further features to replace the assigned activity associated with the model having the highest confidence score.

14. A method according to claim 11, further comprising: adding the new model to the models stored on the mobile computing device.

15. A method according to claim 11, further comprising: generating vectors for the features, wherein the vectors of the features are compared with the models on the mobile computing device.

16. A method according to claim 11, further comprising: transmitting a request to the user of the mobile computing device to identify at least one of the activity being performed and the activity still being performed.

17. A method according to claim 16, wherein the request comprises a list of activities for selection by the user as the identifier of the activity.

18. A method according to claim 16, further comprising: receiving from the user a typed identity of the activity as the identifier.

19. A method according to claim 11, further comprising: training the new model on the server using a combination of labeled population data indexed by activity label and the user's specific contextual data.

20. A method according to claim 11, wherein the feature extraction depends on a type of the contextual data.

\* \* \* \* \*